(12) United States Patent
Sasage

(10) Patent No.: US 8,819,366 B2
(45) Date of Patent: Aug. 26, 2014

(54) DATA PROCESSING DEVICE, NON-TRANSITORY COMPUTER READABLE MEDIUM AND METHOD FOR CONTROLLING DATA PROCESSING DEVICE

(75) Inventor: Koutarou Sasage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 13/212,599

(22) Filed: Aug. 18, 2011

(65) Prior Publication Data
US 2012/0054457 A1 Mar. 1, 2012

(30) Foreign Application Priority Data
Sep. 1, 2010 (JP) .................................. 2010-195289

(51) Int. Cl.
*G06F 12/00* (2006.01)
(52) U.S. Cl.
USPC ............................. 711/162; 711/103; 711/172
(58) Field of Classification Search
USPC ......................................................... 711/162
See application file for complete search history.

(56) References Cited

U.S. PATENT DOCUMENTS

| 2005/0097290 | A1* | 5/2005 | Cochran et al. ................ 711/165 |
| 2007/0011401 | A1* | 1/2007 | Zhang et al. ................... 711/114 |
| 2007/0088976 | A1  | 4/2007 | Daikokuya et al. |
| 2009/0006725 | A1* | 1/2009 | Ito et al. ......................... 711/103 |

FOREIGN PATENT DOCUMENTS

| JP | 2000-253056 | 9/2000 |
| JP | 2000-259467 | 9/2000 |
| JP | 2002-196894 | 7/2002 |
| JP | 2007-94994  | 4/2007 |

OTHER PUBLICATIONS

Japanese Office Action mailed Jan. 28, 2014 in corresponding Japanese Application No. 2010-195289.

* cited by examiner

*Primary Examiner* — April Y Blair
*Assistant Examiner* — Prasith Thammavong
(74) *Attorney, Agent, or Firm* — Staas & Halsey LLP

(57) ABSTRACT

A data processing device has a processing unit configured to copy data stored in a first memory unit into a second memory unit on a block-by-block basis into which the data is divided by a specific size, a time measuring unit configured to measure an amount of time that the processing unit spends on copying the block and a controller configured to change the size of the block to a size smaller than the current size if the measured amount of time runs up to a specific threshold which is shorter than a timeout time.

13 Claims, 29 Drawing Sheets

| TIMEOUT VALUE (T SECONDS) | UPPER LIMIT OF COPY TIME (Tu SECONDS) | LOWER LIMIT OF COPY TIME (Tl SECONDS) | MAXIMUM BLOCK SIZE (X MB) |
|---|---|---|---|
| 10 | 7 | 3 | 16 |

111

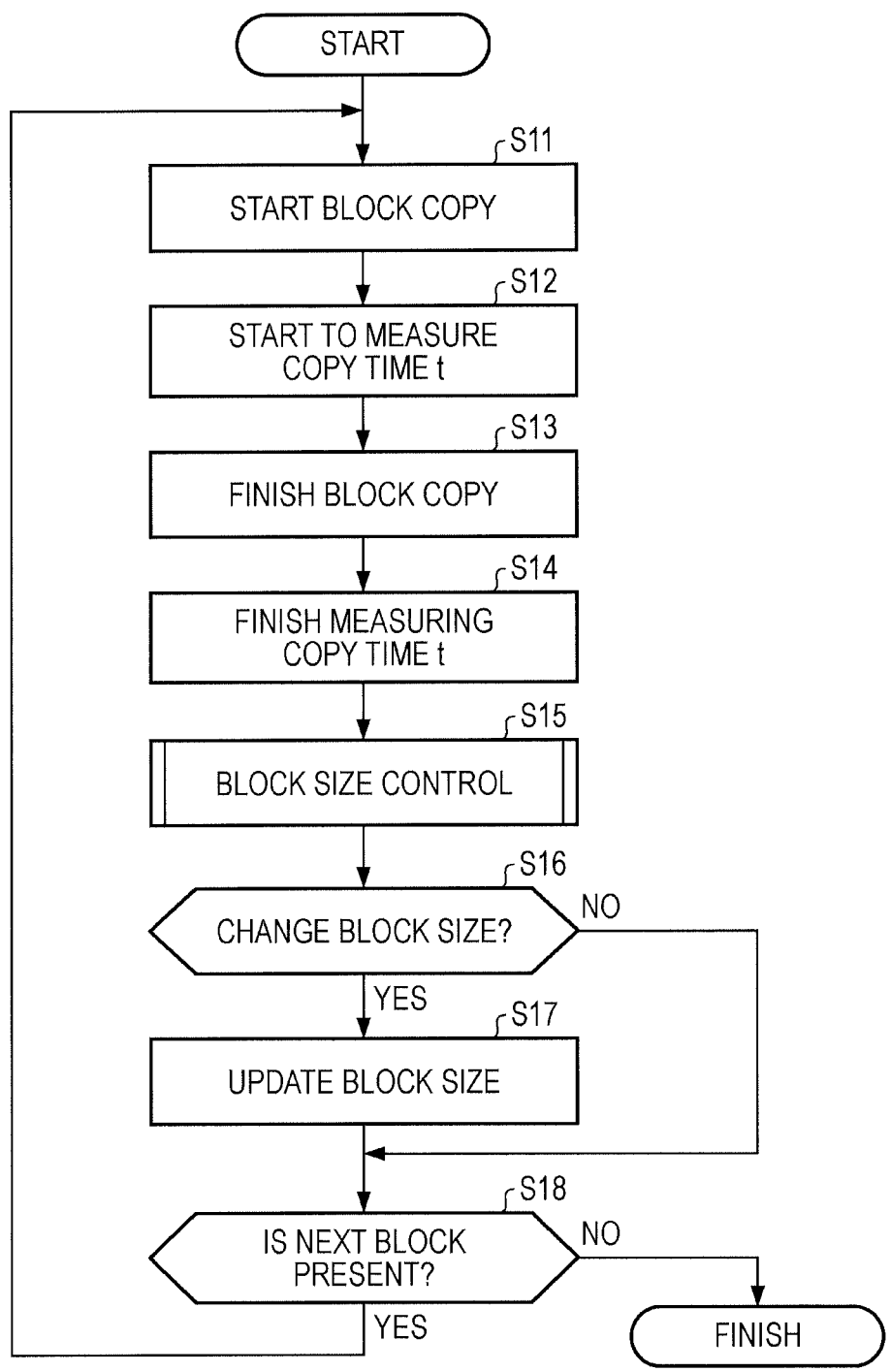

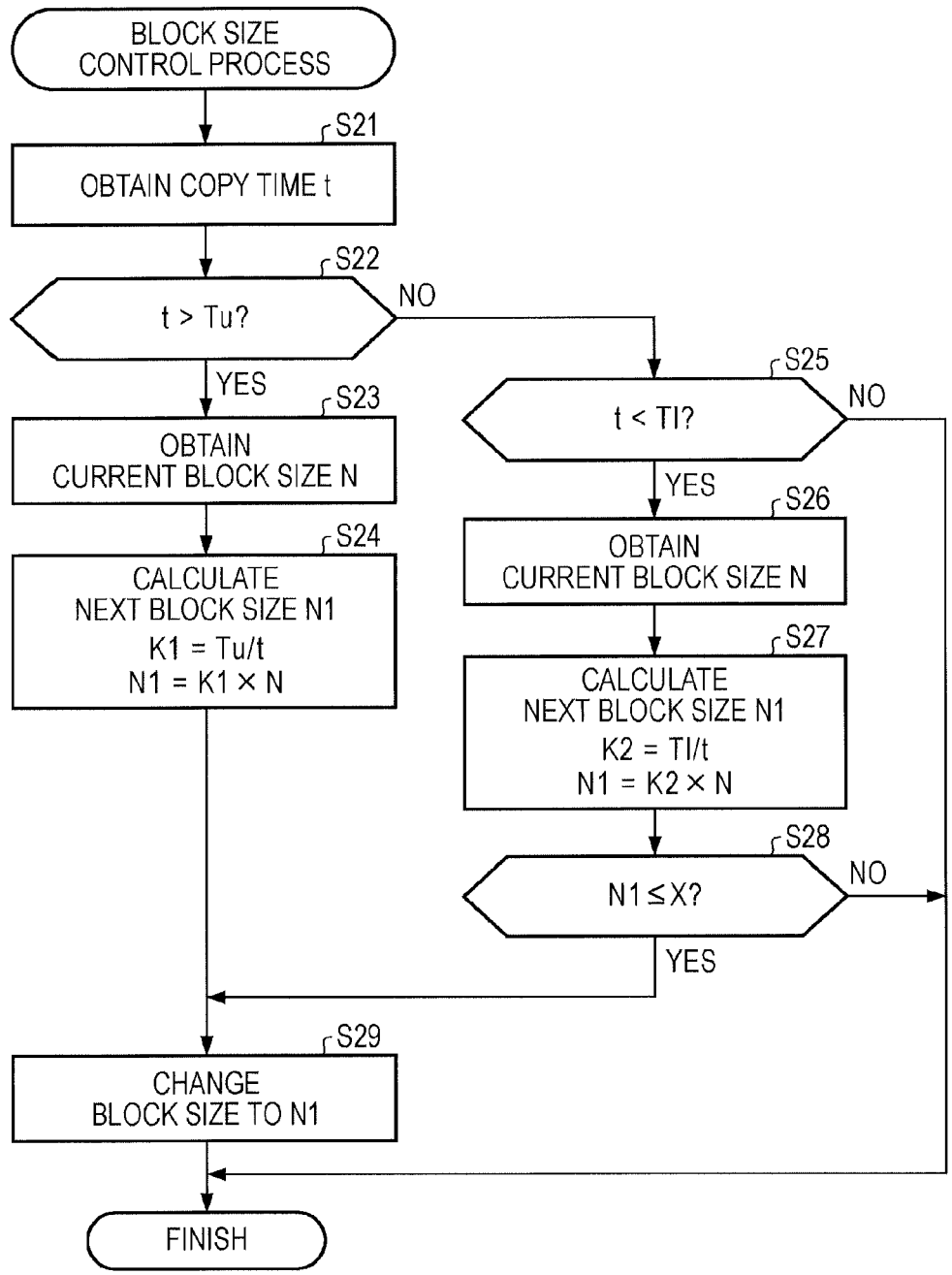

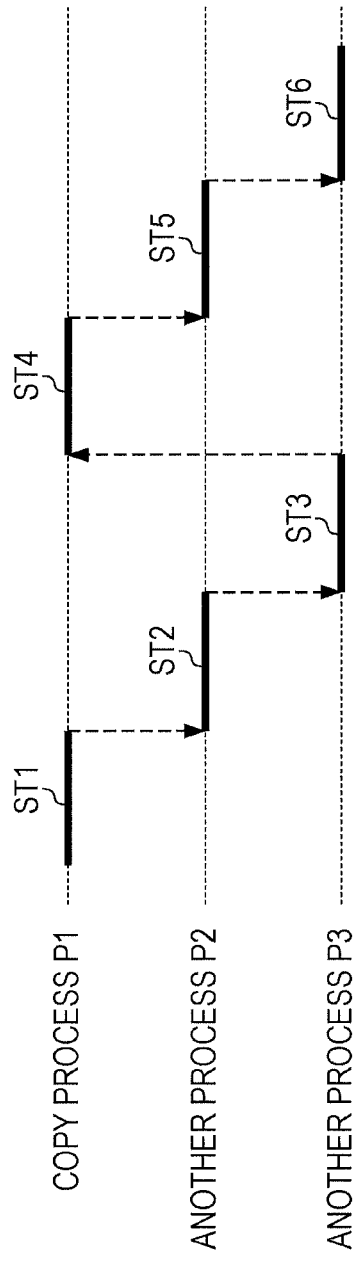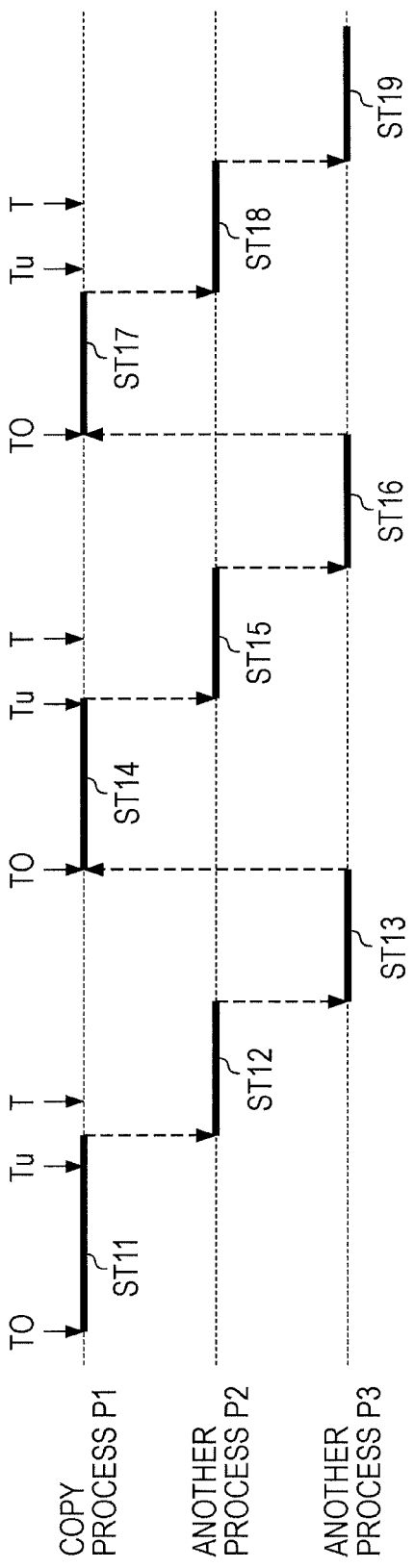

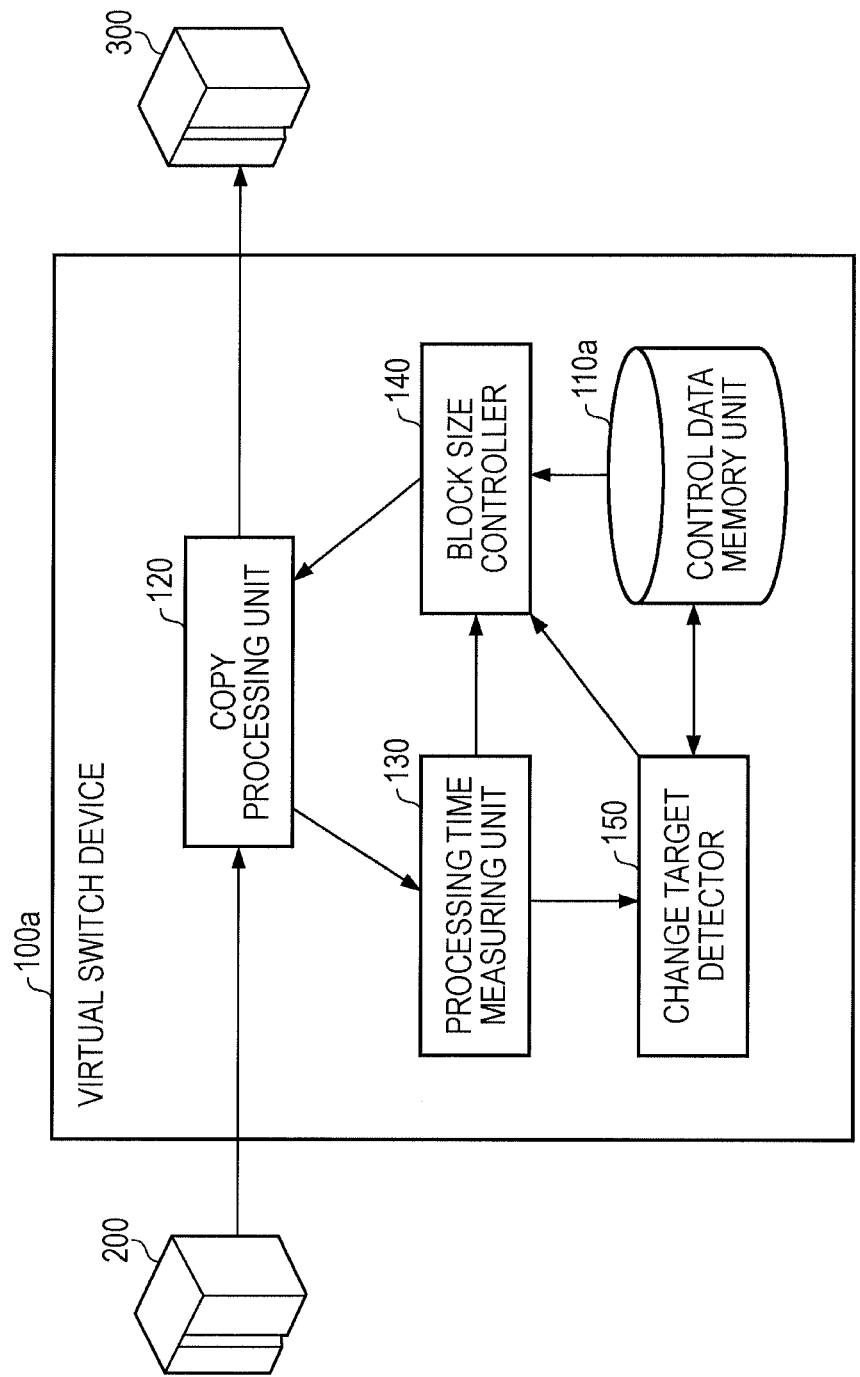

| NO. | LUN | PORT | RAID GROUP | CONTROLLER | HOUSING STRUCTURE |
|---|---|---|---|---|---|
| 1 | LUN1-1 | 001-P00 | 001-R00 | 001-C00 | 001 |
| 2 | LUN1-2 | 001-P01 | 001-R00 | 001-C01 | 001 |
| 3 | LUN1-3 | 001-P00 | 001-R01 | 001-C02 | 001 |
| 4 | LUN1-4 | 001-P00 | 001-R02 | 001-C03 | 001 |
| 5 | LUN2-1 | 002-P00 | 002-R00 | 002-C00 | 002 |
| 6 | LUN2-2 | 002-P01 | 002-R01 | 002-C01 | 002 |
| 7 | LUN2-3 | 002-P00 | 002-R02 | 002-C02 | 002 |
| 8 | LUN2-4 | 002-P02 | 002-R03 | 002-C03 | 002 |
| 9 | LUN3-1 | 003-P00 | 003-R00 | 003-C00 | 003 |
| 10 | LUN3-2 | 003-P01 | 003-R00 | 003-C01 | 003 |
| 11 | LUN3-3 | 003-P02 | 003-R01 | 003-C02 | 003 |
| 12 | LUN3-4 | 003-P03 | 003-R01 | 003-C03 | 003 |

FIG. 16

| COPY PROCESS IDENTIFICATION NUMBER | COPY CONDITIONS | | | | | PRE-TIMEOUT |
|---|---|---|---|---|---|---|
| | LUN | PORT | RAID GROUP | CONTROLLER | HOUSING STRUCTURE | |
| S0001 | LUN1-1 | 001-P00 | 001-R00 | 001-C00 | 001 | OCCURRED |
| S0002 | LUN1-2 | 001-P01 | 001-R00 | 001-C01 | 001 | OCCURRED |
| S0003 | LUN1-3 | 001-P00 | 001-R01 | 001-C02 | 001 | OCCURRED |
| S0004 | LUN1-4 | 001-P00 | 001-R02 | 001-C03 | 001 | OCCURRED |
| D0001 | LUN2-1 | 002-P00 | 002-R00 | 002-C00 | 002 | OCCURRED |
| D0002 | LUN2-2 | 002-P01 | 002-R01 | 002-C01 | 002 | OCCURRED |
| D0003 | LUN2-3 | 002-P00 | 002-R02 | 002-C02 | 002 | OCCURRED |
| D0004 | LUN2-4 | 002-P02 | 002-R03 | 002-C03 | 002 | OCCURRED |
| ... | ... | ... | ... | ... | ... | ... |

| COPY CONDITIONS | POINT | PRIORITY |
|---|---|---|
| LUN | 5 | 1 |
| PORT | 4 | 2 |
| RAID GROUP | 3 | 3 |
| CONTROLLER | 2 | 4 |
| HOUSING STRUCTURE | 1 | 5 |

| COPY PROCESS IDENTIFICATION NUMBER | COPY CONDITIONS | | | | | PRE-TIMEOUT |
|---|---|---|---|---|---|---|
| | LUN | PORT | RAID GROUP | CONTROLLER | HOUSING STRUCTURE | |
| S0001 | LUN1-1 | 001-P00 | 001-R00 | 001-C00 | 001 | OCCURRED |
| S0002 | LUN1-2 | 001-P01 | 001-R00 | 001-C01 | 001 | OCCURRED |
| S0003 | LUN1-3 | 001-P00 | 001-R01 | 001-C02 | 001 | OCCURRED |
| S0004 | LUN1-4 | 001-P00 | 001-R02 | 001-C03 | 001 | OCCURRED |
| D0001 | LUN2-1 | 002-P00 | 002-R00 | 002-C00 | 002 | OCCURRED |
| D0002 | LUN2-2 | 002-P01 | 002-R01 | 002-C01 | 002 | OCCURRED |
| D0003 | LUN2-3 | 002-P00 | 002-R02 | 002-C02 | 002 | OCCURRED |
| D0004 | LUN2-4 | 002-P02 | 002-R03 | 002-C03 | 002 | OCCURRED |
| COMMON COPY PROCESS COUNT | 1 | 3 | 2 | 1 | 4 | — |

| COPY PROCESS IDENTIFICATION NUMBER | COPY CONDITIONS ||||| PRE-TIMEOUT |
| --- | --- | --- | --- | --- | --- | --- |
| | LUN | PORT | RAID GROUP | CONTROLLER | HOUSING STRUCTURE | |
| S0011 | LUN2-1 | 002-P00 | 002-R00 | 002-C00 | 002 | OCCURRED |
| S0012 | LUN2-2 | 002-P01 | 002-R01 | 002-C01 | 002 | OCCURRED |
| S0013 | LUN2-3 | 002-P00 | 002-R02 | 002-C02 | 002 | OCCURRED |
| S0014 | LUN2-4 | 002-P02 | 002-R03 | 002-C03 | 002 | OCCURRED |
| D0011 | LUN3-1 | 003-P00 | 003-R00 | 003-C00 | 003 | OCCURRED |
| D0012 | LUN3-2 | 003-P01 | 003-R00 | 003-C01 | 003 | OCCURRED |
| D0013 | LUN3-3 | 003-P02 | 003-R01 | 003-C02 | 003 | OCCURRED |
| D0014 | LUN3-4 | 003-P03 | 003-R01 | 003-C03 | 003 | OCCURRED |
| COMMON COPY PROCESS COUNT | 1 | 2 | 2 | 1 | 4 | — |

FIG. 23

| COPY PROCESS IDENTIFICATION NUMBER | COPY CONDITIONS ||||| PRE-TIMEOUT |
| --- | --- | --- | --- | --- | --- | --- |
| | LUN | PORT | RAID GROUP | CONTROLLER | HOUSING STRUCTURE | |
| S0001 | LUN1-1 | 001-P00 | 001-R00 | 001-C00 | 001 | OCCURRED |
| D0001 | LUN2-1 | 002-P00 | 002-R00 | 002-C00 | 002 | OCCURRED |
| S0002 | LUN3-1 | 003-P00 | 003-R00 | 003-C00 | 003 | NOT OCCURRED YET |
| D0002 | LUN1-2 | 001-P01 | 001-R00 | 001-C01 | 001 | NOT OCCURRED YET |
| S0003 | LUN2-2 | 002-P01 | 002-R01 | 002-C01 | 002 | NOT OCCURRED YET |
| D0003 | LUN3-3 | 003-P02 | 003-R02 | 003-C02 | 003 | NOT OCCURRED YET |
| COMMON COPY PROCESS COUNT | 1 | 1 | 2 | 1 | 2 | — |

112c

FIG. 25
113
| COPY CONDITIONS | POINT | PRIORITY |
|---|---|---|
| LUN | 5 | 1 |
| PORT | 4 | 2 |
| RAID GROUP | 3 | 3 |
| CONTROLLER | 2 | 4 |
| HOUSING STRUCTURE | 1 | 5 |
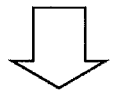
113a
| COPY CONDITIONS | POINT | PRIORITY |
|---|---|---|
| LUN | 5 | 1 |
| PORT | 5 | 1 |
| RAID GROUP | 4 | 3 |
| CONTROLLER | 2 | 4 |
| HOUSING STRUCTURE | 2 | 4 |
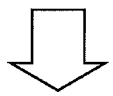
113b
| COPY CONDITIONS | POINT | PRIORITY |
|---|---|---|
| LUN | 5 | 2 |
| PORT | 5 | 1 |
| RAID GROUP | 4 | 3 |
| CONTROLLER | 2 | 5 |
| HOUSING STRUCTURE | 2 | 4 |

| COPY PROCESS IDENTIFICATION NUMBER | HISTORY OF TIME SPENT EACH TIME (IN SECONDS) | | | | | | | | | |
|---|---|---|---|---|---|---|---|---|---|---|
| | -9 | -8 | -7 | -6 | -5 | -4 | -3 | -2 | -1 | 0 |
| 0001 | 1.1 | 2.1 | 3.1 | 3.2 | 2.3 | 1.2 | 2.3 | 3.2 | 4.3 | 7.2 |
| 0002 | 1.0 | 1.0 | 2.0 | 2.0 | 3.0 | 3.0 | 2.0 | 2.0 | 3.0 | 3.0 |
| 0003 | 1.0 | 2.0 | 3.0 | 3.0 | 2.0 | 1.0 | 2.0 | 3.0 | 4.0 | 6.3 |
| 0004 | 3.0 | 2.0 | 1.0 | 1.0 | 2.0 | 2.0 | 3.0 | 3.0 | 2.0 | 1.0 |

FIG. 28

| COPY PROCESS IDENTIFICATION NUMBER | RATIO TO THE PREVIOUS TIME | | | | | | | | | |
|---|---|---|---|---|---|---|---|---|---|---|
| | -9 | -8 | -7 | -6 | -5 | -4 | -3 | -2 | -1 | 0 |
| 0001 | — | 1.91 | 1.48 | 1.03 | 0.72 | 0.52 | 1.92 | 1.39 | 1.34 | 1.67 |
| 0002 | — | 1.00 | 2.00 | 1.00 | 1.50 | 1.00 | 0.67 | 1.00 | 1.50 | 1.00 |
| 0003 | — | 2.00 | 1.50 | 1.00 | 0.67 | 0.50 | 2.00 | 1.50 | 1.33 | 1.58 |
| 0004 | — | 0.67 | 0.50 | 1.00 | 2.00 | 1.00 | 1.50 | 1.00 | 0.67 | 0.50 |

FIG. 29

| COPY PROCESS IDENTIFICATION NUMBER | ABSOLUTE VALUE OF DIFFERENCE FROM COMPARABLE RATIO | | | | | | | | | | SUM |
|---|---|---|---|---|---|---|---|---|---|---|---|
| | -9 | -8 | -7 | -6 | -5 | -4 | -3 | -2 | -1 | 0 | |
| 0001 | — | 0 | 0 | 0 | 0 | 0 | 0 | 0 | 0 | 0 | 0 |
| 0002 | — | 0.91 | 0.52 | 0.03 | 0.78 | 0.48 | 1.25 | 0.39 | 0.21 | 1.00 | 4.73 |
| 0003 | — | 0.09 | 0.02 | 0.03 | 0.05 | 0.02 | 0.08 | 0.11 | 0.01 | 0.09 | 0.52 |
| 0004 | — | 1.24 | 0.98 | 0.03 | 1.28 | 0.48 | 0.42 | 0.39 | 0.71 | 0.50 | 6.20 |

DATA PROCESSING DEVICE, NON-TRANSITORY COMPUTER READABLE MEDIUM AND METHOD FOR CONTROLLING DATA PROCESSING DEVICE

CROSS-REFERENCE TO RELATED APPLICATION

This application is based upon and claims the benefit of priority of the prior Japanese Patent Application No. 2010-195289, filed on Sep. 1, 2010, the entire contents of which are incorporated herein by reference.

FIELD

The present art relates to a data processing device for copy processing.

BACKGROUND

Data processing done by the use of a computer comes into wide use these days, and storage technologies for storing and using data become more and more important. In this aspect, technology called RAID (Redundant Arrays of Independent Disks) has been usually used as a storage technology for accelerating data access and achieving higher reliability of data storage. According to RAID, data is divided and copied as necessary, and is distributed over and put in a plurality of disk devices. Thus, load is distributed among the plural disks so that data access may be accelerated, and data is rendered redundant so that higher reliability may be achieved.

Incidentally, a recent trend is to build a virtual storage system which provides a user with a combination of plural memory areas each built through RAID. The virtual storage system has a plurality of storage devices connected to one another through a network and a virtual switch device. The virtual switch device combines memory areas in the plural storage devices so as to build a logical memory area to be provided. A user may easily manage data by using the memory area without being conscious of the storage devices serving under the virtual switch device.

Data is copied in the virtual storage system mentioned here, e.g., for making a backup. If a user tries to copy large-sized data at once, arithmetic operation resources are occupied by the copy process for a long time, resulting in that another process such as host I/O (Input/Output) waits to be run for a longer period of time. Thus, it is conceivable to copy the data to be copied on a block-by-block basis of a specific size. Upon copying the data on the block-by-block basis while changing over to another process, the copy process and another process may be run apparently in parallel.

Japanese Laid-open Patent Publications No. 2000-259467 and 2007-094994 are examples of related art.

Even if data is copied on a block-by-block basis into which the data is divided (a process for copying an individual block is called a block copy, hereafter), however, a period of time for which another process waits to be run is extended if a certain block copy needs a long time. Thus, a longest period of time allowed for one block copy is specified (timeout) in general. If a timeout occurs in a certain block copy, the block copy is interrupted and another process scheduled next may be started.

Meanwhile, the block copy interrupted by the timeout remains incomplete. Thus, the same block needs a retry. In that case, if the target storage device continuously remains in a heavily loaded state when the retry is done, another timeout may possibly occur again. Then, still another retry may possibly be needed in a vicious circle.

SUMMARY

According to an aspect of an invention, a data processing device has a processing unit configured to copy data stored in a first memory unit into a second memory unit on a block-by-block basis into which the data is divided by a specific size, a time measuring unit configured to measure an amount of time that the processing unit spends on copying the block and a controller configured to change the size of the block to a size smaller than the current size if the measured amount of time runs up to a specific threshold which is shorter than a timeout time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a flowchart which illustrates a copy process of the second embodiment.

FIG. 9 is a flowchart which illustrates a block size control process of the second embodiment.

FIG. 10 specifically illustrates an exemplary flow of a regular copy process of the second embodiment.

FIG. 11 specifically illustrates a first exemplary flow of a copy process of the second embodiment.

FIG. 14 illustrates a functional structure of a virtual switch device of a third embodiment.

FIG. 15 illustrates an exemplary data structure in a logical unit management table of the third embodiment.

FIG. 16 illustrates an exemplary data structure in a copy process management table of the third embodiment.

FIG. 17 illustrates an exemplary data structure in a priority table of the third embodiment.

FIG. 20 specifically illustrates a first exemplary copy process extraction table of the third embodiment.

FIG. 21 specifically illustrates a second exemplary copy process extraction table of the third embodiment.

FIG. 23 specifically illustrates an exemplary copy process extraction table of the third embodiment.

FIG. 25 illustrates an exemplary priority update process of the third embodiment.

FIG. 27 illustrates an exemplary data structure in a spent time history table of the fourth embodiment.

FIG. 28 illustrates an exemplary data structure in a ratio table of the fourth embodiment.

FIG. 29 illustrates an exemplary data structure in a difference table of the fourth embodiment.

DESCRIPTION OF EMBODIMENTS

The embodiments will be explained in detail below with reference to the drawings.

First Embodiment

Figure 1:
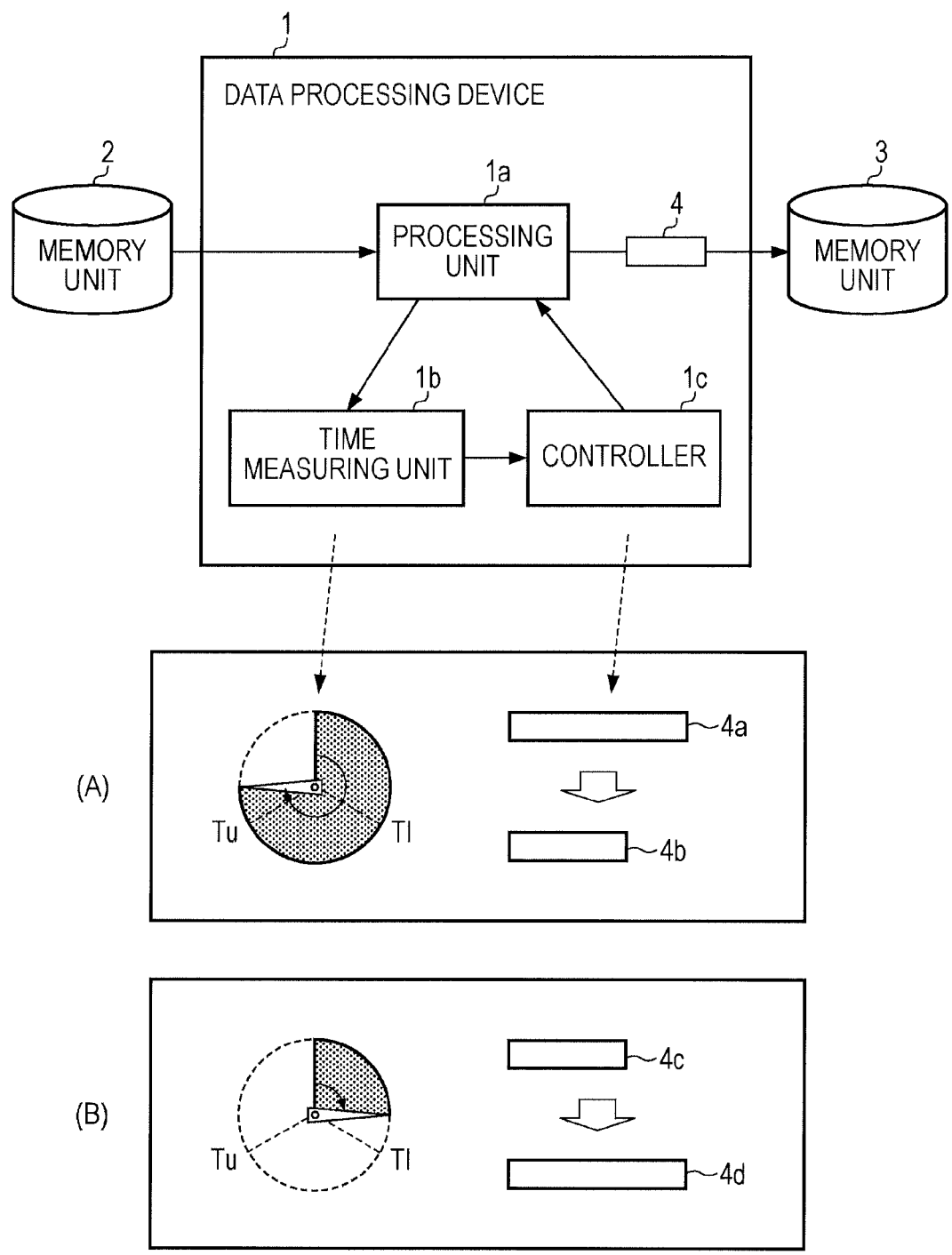
FIG. 1 illustrates a data processing device of a first embodiment.

FIG. 1 illustrates a data processing device of a first embodiment. A data processing device 1 has a processing unit 1a, a time measuring unit 1b and a controller 1c.

The processing unit 1a copies data stored in a memory unit 2 into a memory unit 3 on a block-by-block basis into which the data is divided by a specific size of a block 4. When, e.g., moving or backing up data stored in the memory unit 2 into the memory unit 3, the processing unit is copies the data. That is, specifically, upon accepting a user's operation to copy data or upon redundantly making memory areas in the memory units 2 and 3 (rebuilding or copying back).

A block copy in this case specifically follows a procedure such that: (1) the processing unit is obtains a block 4 from the memory unit 2; and (2) the processing unit is outputs the obtained block 4 to the memory unit 3 and makes the memory unit 3 record the block 4. In this way, the processing unit 1a obtains a block 4 from a portion of data to be copied but not copied yet, and successively copies the block 4 from the memory unit 2 to the memory unit 3.

The time measuring unit 1b measures an amount of time spent by the processing unit 1a on copying a block 4. The amount of time measured by the time measuring unit 1b is an amount of time that the processing unit 1a spends since starting the above process (1) and until finishing the above process (2). Incidentally, an amount of time spent on a block copy is sometimes called copy time.

If the amount of time measured by the time measuring unit 1b runs up to a particular threshold Tu which is shorter than the timeout time, the controller 1c changes a block size 4a to a block size 4b smaller than the present size. Then, the controller 1c instructs the processing unit 1a to make a block copy in the block size 4b.

Further, if the amount of time measured by the time measuring unit 1b is shorter than a threshold Tl, the controller 1c changes a block size 4c to a block size 4d larger than the present size. Then, the controller 1c instructs the processing unit 1a to make a block copy in the block size 4d.

According to the data processing device 1, the processing unit 1a copies data stored in the memory unit 2 into the memory unit 3 on a block-by-block basis of the block 4. The time measuring unit 1b measures an amount of time that the processing unit 1a spends on copying a block 4. If the measured amount of time runs up to the particular threshold Tu which is shorter than the timeout time, the controller 1c changes the block size 4a to the block size 4b smaller than the present size.

Data may thereby be efficiently copied, specifically as follows. An amount of time that the processing unit 1a spends on making a block copy is presumably affected by loads on the memory units 2 and 3. If, e.g., either one or one side of both nodes is heavily loaded, the copy time of the processing unit 1a is extended long. The copy time extended too long affects an amount of time to wait for another process to be run, and conceivably causes a timeout resulting in interrupting a block copy in some cases. In such a case, a retry of the interrupted block copy is needed as to a block including same contents, resulting in that the process for copying target data and another process may possibly delay further. Thus, if the copy time is long, make the block size small. A period of time needed for one block copy is thereby shortened, so that an effect given to an amount of time to wait for another process to be run may be reduced. Further, a timeout may be prevented from occurring.

Meanwhile, if the both nodes are lightly loaded, e.g., the copy time of the processing unit 1a is shortened. If the copy time is too short, however, block copies are made more frequently. Then, as a plurality of processes including the copy process and another process are changed over to be run in the data processing device 1, resulting in an increase in overhead and that the copy process may possibly delay in reverse. Thus, if the copy time is short, e.g., make the block size large. The above overhead may thereby be reduced, and the delay of the copy process caused by the data processing device 1 may be reduced, as well.

Further, it is unnecessary to obtain the loads on the memory units 2 and 3 in order to determine whether the block size needs to be changed. Thus, the function may be easily introduced into a storage system, etc. The embodiments will be explained below in more detail in a case, e.g., where the data processing device 1 is applied to a virtual storage system.

Second Embodiment

Figure 2:
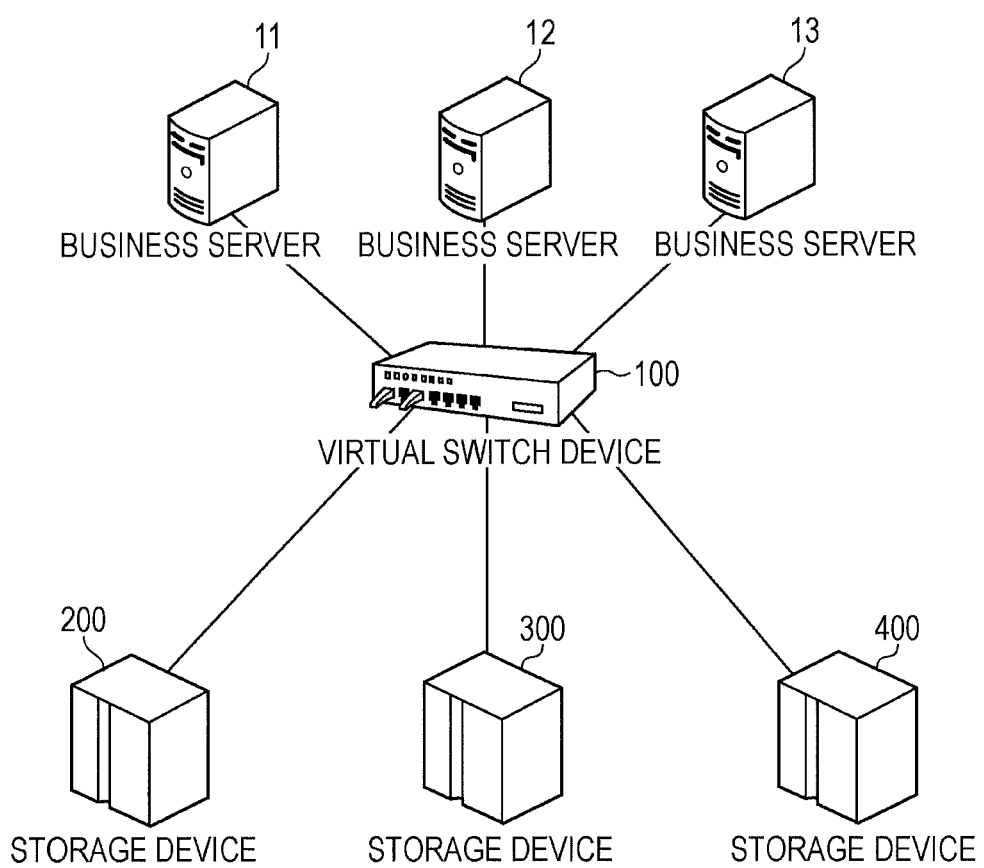
FIG. 2 illustrates a virtual storage system of a second embodiment.

FIG. 2 illustrates a virtual storage system of a second embodiment. The virtual storage system provides a plurality of users with a highly reliable RAID system. The users each may manage data handled in the server 11, 12 or 13 by the use of the RAID system provided by the virtual storage system.

The virtual storage system has a virtual switch device 100 and storage devices 200, 300 and 400. The storage devices 200, 300 and 400 and the servers 11, 12 and 13 are connected to the virtual switch device 100, and they form a storage area network (SAN). The virtual storage system is operated by a service provider. The service provider provides the RAID system in a service form which is sometimes called, e.g., IaaS (Infrastructure as a Service).

The virtual switch device 100 builds a logical memory area by combining the storage devices 200, 300 and 400 with one another which are connected to the virtual switch device 100. The memory area is called a logical volume, hereafter. The virtual switch device 100 provides the servers 11, 12 and 13 with an environment in which the logical volume is used. The virtual switch device 100 controls the logical volume for making, copying, removing, opening or updating data therein.

The storage devices 200, 300 and 400 each are a RAID system which includes and uses a plurality of memory devices such as HDDs (Hard Disk Drives) or SSDs (Solid State Drives). The storage devices 200, 300 and 400 each have a plurality of RAID groups. The storage devices 200, 300 and 400 each store therein data handled by the server 11, 12 or 13, e.g., for every client.

A plurality of logical unit numbers (LUN) is defined for each of the RAID groups. The LUN is a piece of ID information which indicates a logical memory area (logical area) recognized as one memory device by an OS (Operating System) of each of the servers 11, 12 and 13. Incidentally, the term LUN is sometimes used as what indicates the logical memory area itself, hereafter.

The servers 11, 12 and 13 each carry out a application. The servers 11, 12 and 13 each store data processed in the application into a logical area provided by the virtual switch device 100.

Figure 3:
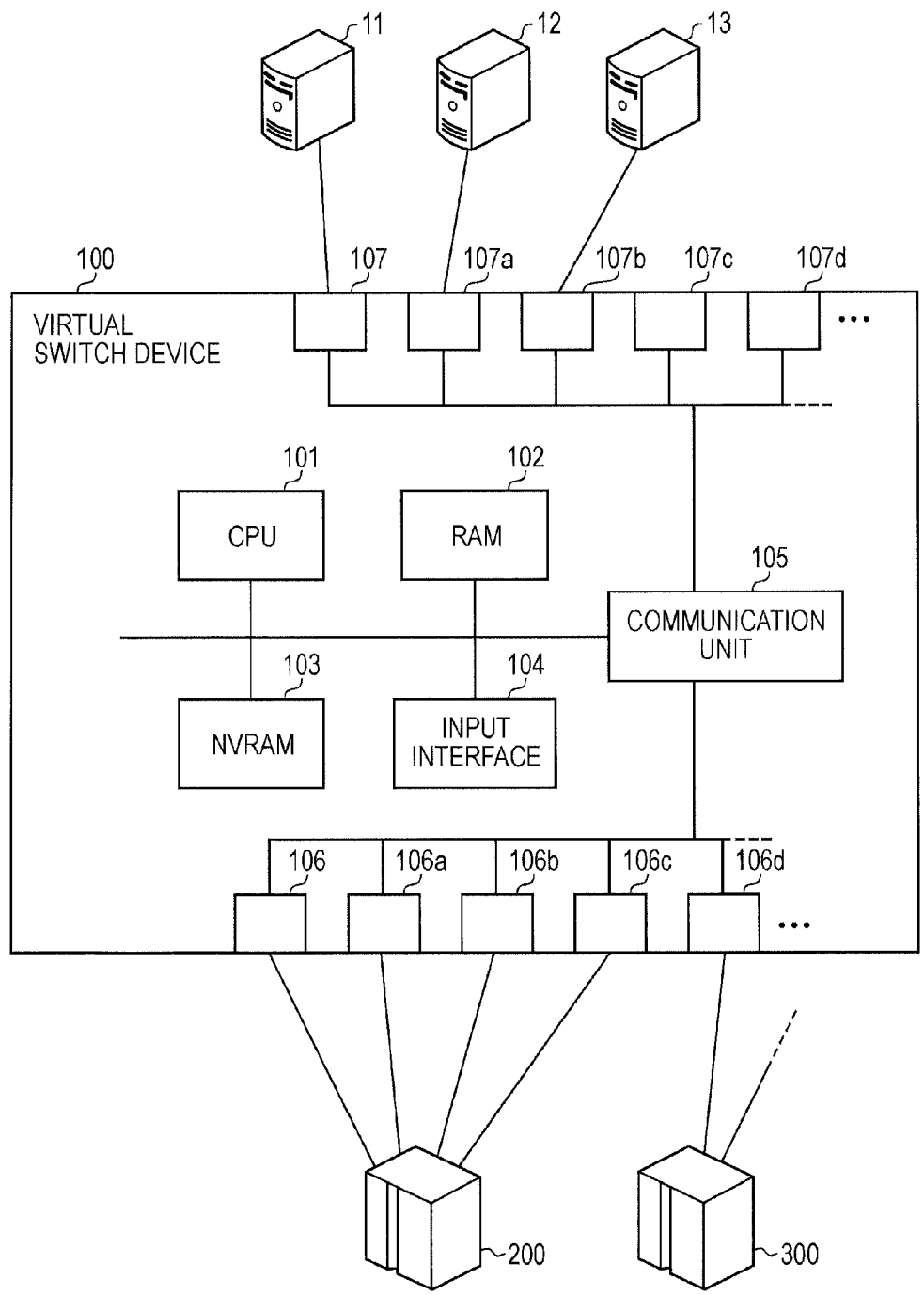
FIG. 3 illustrates a hardware configuration of the virtual switch device of the second embodiment.

FIG. 3 illustrates a hardware configuration of the virtual switch device of the second embodiment. The virtual switch device 100 has a CPU (Central Processing Unit) 101, a RAM (Random Access Memory) 102, a NVRAM (Non Volatile RAM) 103, an input interface 104, a communication unit 105, ports 106, 106a, 106b, 106c, 106d and so forth, and ports 107, 107a, 107b, 107c, 107d and so forth.

The CPU 101 controls the entire operation of the virtual switch device 100. The RAM 102 temporarily stores therein at least part of an OS program or an application software (called "application" hereafter) program to be run by the CPU 101. Further, the RAM 102 stores therein various data used for a process by the CPU 101.

The NVRAM 103 stores therein an OS program and an application program. Further, the NVRAM 103 stores therein various data used for a process by the CPU 101. The input interface 104 accepts an input from an external device. The input interface is, e.g., a serial communication port. A system administrator may connect a computer for maintenance operation to the input interface 104, so as to make various settings to the virtual switch device 100 by using a protocol such as Telnet.

The communication unit 105 runs a data communication process. The communication unit 105 is connected to the ports 106, 106a, 106b, 106c, 106d and so forth, and to the ports 107, 107a, 107b, 107c, 107d and so forth.

The ports 106, 106a, 106b, 106c, 106d and so forth are communication ports connected to the storage devices 200, 300 and 400. The ports 106, 106a, 106b, 106c, 106d and so forth are interfaces for a Fibre Channel, e.g. In this case, the virtual switch device 100 and the storage devices 200, 300 and 400 are connected through the ports 106, 106a, 106b, 106c, 106d and so forth by the use of fiber cables or coaxial cables.

As illustrated in FIG. 3, e.g., the storage device 200 is connected to the ports 106, 106a, 106b and 106c. The storage devices 300 and 400 each are connected to a plurality of the ports 106d and so forth, similarly as the storage device 200. A communication channel redundantly configured in this way may contribute to enhancing reliability of communication.

The ports 107, 107a, 107b, 107c, 107d and so forth are communication ports connected to the servers 11, 12 and 13. The ports 107, 107a, 107b, 107c, 107d and so forth are interfaces for a fiber channel, e.g.

As illustrated in FIG. 3, e.g., the server 11 is connected to the port 107. The server 12 is connected to the port 107a. The server 13 is connected to the port 107b. The connections between the servers 11, 12 and 13 and the ports 107, 107a, 107b, 107c, 107d and so forth may be redundantly configured similarly as the connections between the storage devices 200, 300 and 400 and the ports 106, 106a, 106b, 106c, 106d and so forth.

Figure 4:
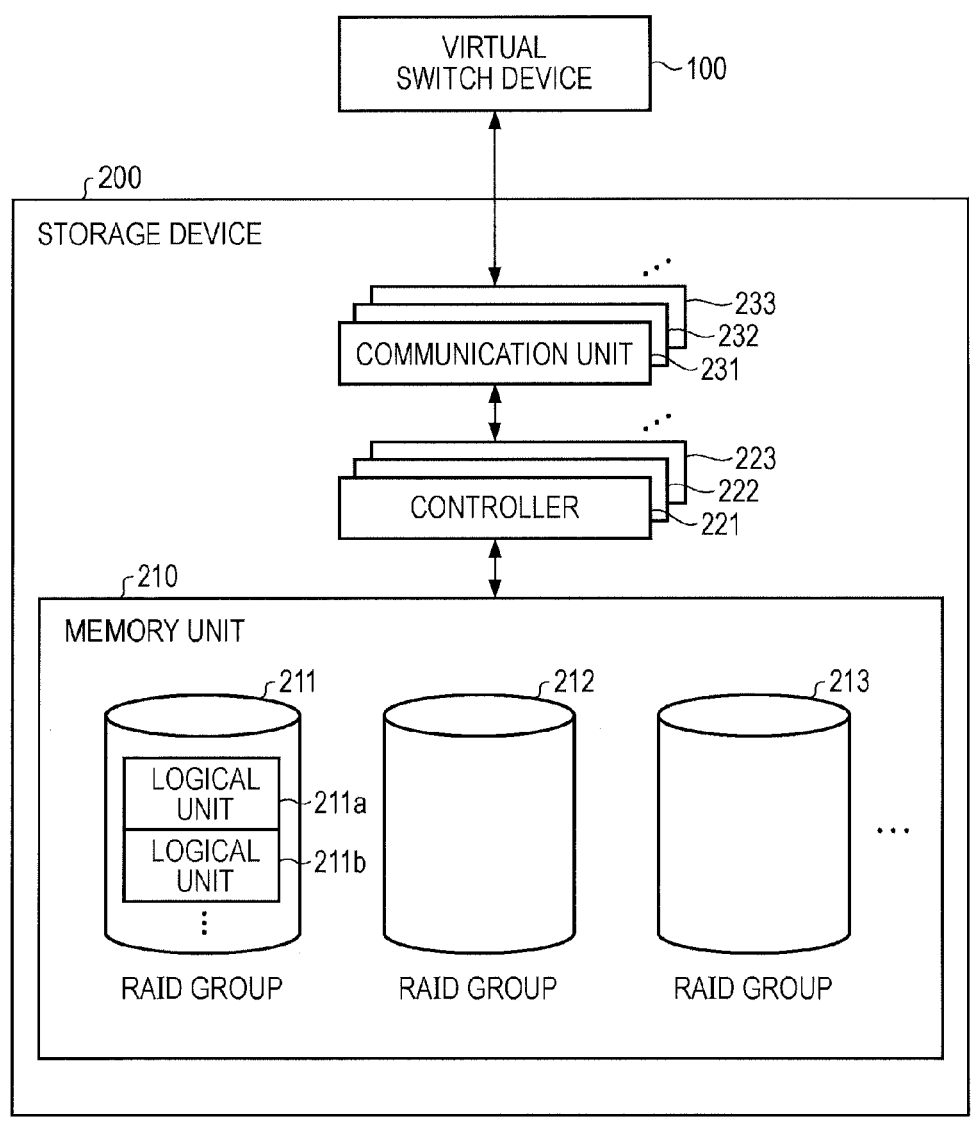
FIG. 4 illustrates a hardware configuration of the storage device of the second embodiment.

FIG. 4 illustrates a hardware configuration of the storage device of the second embodiment. The storage device 200 has a memory unit 210, controllers 221, 222, 223 and so forth, and communication units 231, 232, 233 and so forth.

The memory unit 210 is formed by a plurality of memory devices. The memory unit 210 has RAID groups 211, 212, 213 and so forth. The RAID groups 211, 212, 213 and so forth each are a memory area built through a combination of part of a plurality of memory devices. RAID levels of the RAID groups 211, 212, 213 and so forth may be either identical with one another or different from one another. All the RAID groups, e.g., may be set to RAID 5. The RAID levels may be different from one another RAID group by RAID group, in such a way that the RAID groups 211 and 212 are set to RAID 1 and RAID 5, respectively.

The RAID group 211 includes logical units 211a, 211b and so forth. The logical units 211a, 211b and so forth are memory areas into which a memory area of the RAID group 211 is divided and then defined. Incidentally, one or a plurality of logical units are defined in each of the RAID groups 212, 213 and so forth similarly as in the RAID group 211.

The controllers 221, 222, 223 and so forth build the RAID groups 211, 212, 213 and so forth by combining the memory devices included in the memory unit 210 with one another. Further, the controllers 221, 222, 223 and so forth control data access to the respective logical units included in the RAID groups 211, 212, 213 and so forth.

The communication units 231, 232, 233 and so forth each are connected to the virtual switch device 100 through a fiber cable, etc. and performs data communication. As the communication units 231, 232, 233 and so forth are redundantly configured in this way, the communication channel between the virtual switch device 100 and the storage device 200 may be enhanced in reliability or communication throughput.

Figure 5:
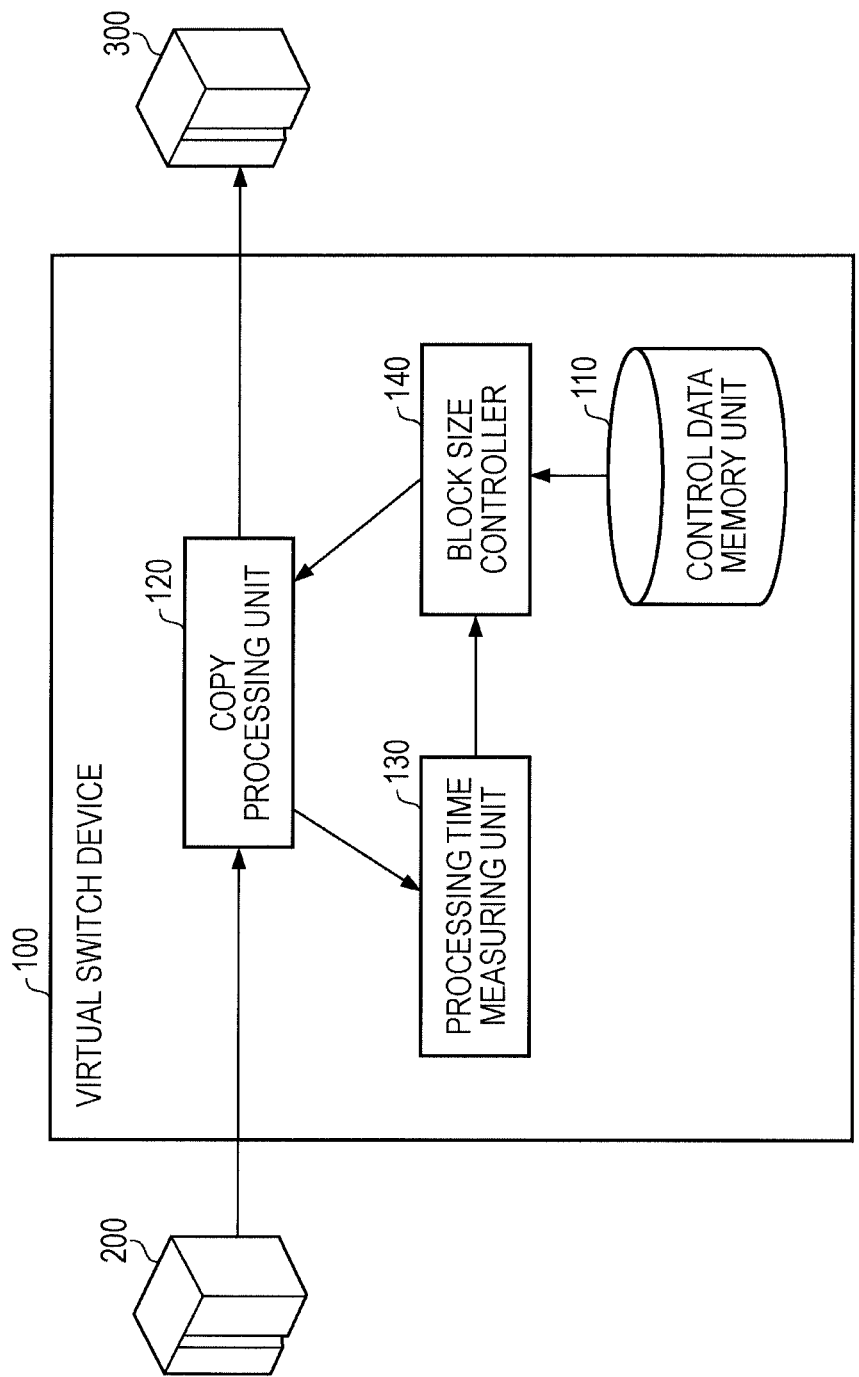
FIG. 5 is a functional block diagram of the virtual switch device of the second embodiment.

Incidentally, the storage devices 300 and 400 each may be implemented by a hardware configuration similar to that of the storage device 200. FIG. 5 is a functional block diagram of the virtual switch device of the second embodiment. The virtual switch device 100 has a control data memory unit 110, a copy processing unit 120, a processing time measuring unit 130 and a block size controller 140. These functions are implemented by the CPU 101 running specific programs. These functions may be partially or entirely implemented by hardware components for exclusive use, instead.

The control data memory unit 110 stores therein control data necessary for block size control. The copy processing unit 120 copies data between two of the storage devices or in one of the storage devices. The copy processing unit 120 copies data, e.g., between one of the logical units provided in the storage device 200 and one of the logical units provided in the storage device 300 (FIG. 5 illustrates this case). The copy processing unit 120 copies data, e.g., between two of the logical units provided in the storage device 200. Although it is assumed and explained below that data is copied from the storage device 200 to the storage device 300, data may be similarly copied between other storage devices or in one and the same storage device.

The copy processing unit 120 specifically follows a procedure for running a copy process such that: (1) the copy processing unit 120 obtains data to be copied from the storage device 200 on a block-by-block basis of a specific size; and (2) the copy processing unit 120 outputs the obtained blocks to the storage device 300 on which the blocks are recorded. In this way, the copy processing unit 120 obtains a portion of the data to be copied but not copied yet on a block-by-block basis, and successively copies the blocks from the storage device 200 to the storage device 300.

The processing time measuring unit 130 measures copy time spent by the copy processing unit 120. The copy time that the processing time measuring unit 130 measures is an amount of time that the copy processing unit 120 spends since starting the process of above (1) and until finishing the process (2). The processing time measuring unit 130 outputs the measured time to the block size controller 140.

The block size controller 140 changes a block size of a block on the basis of the time measured by the processing time measuring unit 130. The block size controller 140 instructs the copy processing unit 120 to copy data in the block size having been changed.

Figures 6, 7:
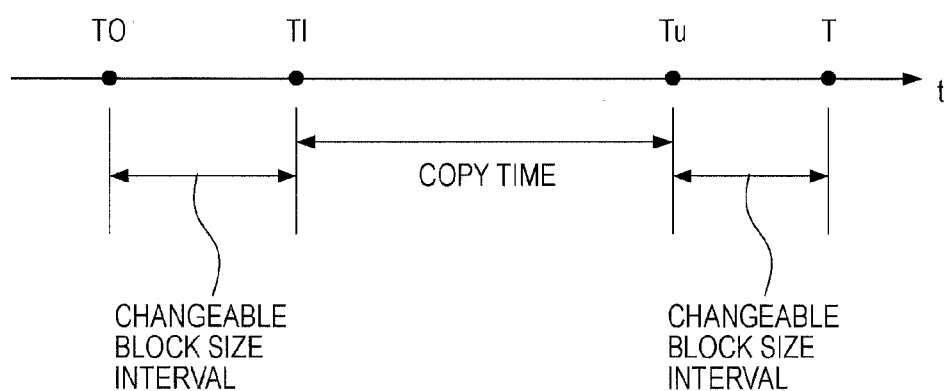
FIG. 6 illustrates an exemplary data structure of a control value table of the second embodiment.
FIG. 7 illustrates respective intervals of a copy process of the second embodiment.

FIG. 6 illustrates an exemplary data structure of a control value table of the second embodiment. The control value table 111 is stored in the control data memory unit 110 in advance. The control value table 111 is provided with columns indicating a timeout value, an upper limit of copy time, a lower limit of copy time and a maximum block size.

A timeout value T of the copy time per one block is set (in seconds) in the timeout value column. An upper limit value Tu to be allowed for the copy time is set (in seconds) in the upper limit of copy time column. A lower limit value Tl to be allowed for the copy time is set (in seconds) in the lower limit of copy time column. A maximum value X of the block size to be copied is set (in MB: Mega Bytes) in the maximum block size column.

Pieces of information are set in the control value table 111 such that, e.g., the timeout value T is "ten" seconds, the upper limit of copy time is "seven" seconds, the lower limit of copy time is "three" seconds, and the maximum block size X is "16" MB.

The timeout value T being "ten" seconds indicates that the copy processing unit 120 interrupts a copy process for a current block if "ten" seconds has passed after starting the copy process. The upper limit of copy time being "seven" (seconds) and the lower limit of copy time being "three" (seconds) indicate that an amount of time allowed as the copy time ranges from "three" to "seven" (seconds) since the start of the copy process. The block size is not changed in the interval between Tl and Tu within the period of time between the start of the copy process and the timeout value T. The maximum block size X being "16" (MB) indicates a maximum size of one block, and a block size which is larger than the maximum size is forbidden. The copy processing unit 120 not being overloaded regularly carries out a block copy in the maximum block size X so as to accelerate the copy process.

FIG. 7 illustrates respective intervals in a copy process of the second embodiment. The time T0 indicates the time when the copy process starts. The interval between the starting time T0 and the lower limit of the copy time Tl is a changeable block size interval, and so is the interval between the upper limit of the copy time Tu and the timeout time T. If the time measured by the processing time measuring unit 130 is in the changeable block size interval, the copy processing unit 120 changes the block size. Specifically, if the time measured by the processing time measuring unit 130 is in the interval between Tu and T, the copy processing unit 120 makes the block size smaller. Further, if the time measured by the processing time measuring unit 130 is in the interval between T0 and Tl, the copy processing unit 120 makes the block size larger.

A fact that the time measured by the processing time measuring unit 130 is in the interval between Tu and T is called a pre-timeout. Then, a procedure in which the virtual switch device 100 configured as described above runs a process will be explained.

FIG. 8 is a flowchart which illustrates a copy process of the second embodiment. The individual processes will be explained below in order of the operation numbers.

In operation S11, the copy processing unit 120 starts to copy target data on a block-by-block basis (block copy).

In operation S12, the processing time measuring unit 130 starts to measure an amount of processing time of a block copy that the copy processing unit 120 has started.

In operation S13, the copy processing unit 120 finishes copying one block.

In operation S14, if the copy processing unit 120 finishes copying one block, the processing time measuring unit 130 outputs the time between the start and the finish to the block size controller 140.

In operation S15, the block size controller 140 changes the block size on the basis of the time measured by the processing time measuring unit 130. When changing the block size, the block size controller 140 indicates a block size after being changed to the copy processing unit 120.

In operation S16, the copy processing unit 120 identifies whether a change of the block size is indicated by the block size controller 140. If a change is indicated, the copy processing unit 120 shifts the process to a S17. If no change is indicated, the copy processing unit 120 shifts the process to a S18.

In operation S17, the copy processing unit 120 changes the block size to the indicated value.

In operation S18, the copy processing unit 120 identifies whether there is a block to be transmitted next. If there is a block to be transmitted next, the copy processing unit 120 shifts the process to the S11. If there is no block to be transmitted next, the copy processing unit 120 finishes the process. If part of target data of the copy process remains before being transmitted, the copy processing unit 120 identifies that there is a block to be transmitted next. Meanwhile, if none of the target data remains before being transmitted, the copy processing unit 120 identifies that there is no block to be transmitted next.

The virtual switch unit 100 copies data successively on a block-by-block basis in the block size indicated by the block size controller 140 in this way. Then, a procedure of the block size control process at the above S15 will be explained in detail.

FIG. 9 is a flowchart which illustrates a block size control process of the second embodiment. The individual processes will be explained below in order of the operation numbers.

In operation S21, the block size controller 140 obtains the copy time t measured by the processing time measuring unit 130.

In operation S22, the block size controller 140 identifies whether t>Tu. The variable Tu mentioned here is an upper limit of the copy time defined in the control value table 111 stored in the control data memory unit 110. If t>Tu, the block size controller 140 shifts the process to a S23. If t<=Tu, the block size controller 140 shifts the process to a S25.

In operation S23, the block size controller 140 obtains a current block size N. The block size controller 140 holds a previously determined block size in the RAM 103, e.g., on the occasion of that determination. Then, the block size controller 140 may obtain N by referring to the RAM 103. Further, the block size controller 140 may obtain N from the copy processing unit 120.

In operation S24, the block size controller 140 calculates a next block size N1. The block size controller 140 specifically lets a copy block coefficient be K1=Tu/t. The block size controller 140 calculates N1 by the use of K1, where N1=K1×N. Then, the block size controller 140 shifts the process to a S29.

In operation S25, the block size controller 140 identifies whether t<Tl. The variable Tl mentioned here is a lower limit of the copy time defined in the control value table 111 stored in the control data memory unit 110. If t<Tl, the block size controller 140 shifts the process to a S26. If t>=Tl, the block size controller 140 finishes the process.

In operation S26, the block size controller 140 obtains a current block size N, specifically by using the method described as to the S23.

In operation S27, the block size controller 140 calculates a next block size N1. The block size controller 140 specifically lets a copy block coefficient be K2=Tl/t, and then calculates N1=K2×N.

In operation S28, the block size controller 140 identifies whether N1<=X. The variable X mentioned here is a maximum block size defined in the control value table 111. If N1<=X, the block size controller 140 shifts the process to a S29. If N1>X, the block size controller 140 finishes the process.

In operation S29, the block size controller 140 notifies the copy processing unit 120 of a request to change the block size to N1. Then, the block size controller 140 finishes the process. The block size controller 140 changes the block size from N to N1. To put it specifically, if the measured time t is larger than the upper limit of the copy time Tu, the block size controller 140 multiplies the current block size N by K1 (K1<1) so as to determine the block size in such a way as N1<N.

Meanwhile, if the measured time t is smaller than the lower limit of the copy time Tl, the block size controller 140 multiplies the current block size N by K2 (K2>1) so as to determine the block size in such a way as N2>N. The block size is limited to the maximum block size X on the upper side, though. Because a pre-timeout or a timeout will more possibly occur if the block size exceeds the maximum block size X. Incidentally, why the block size is controlled so as to grow larger is that a small block size results in that an amount of data which may be copied once decreases and a copy performance is degraded. That is, in order to prevent an amount of time spent until the copy process is finished from being extended too long.

The copy processing unit 120 runs a copy process for a next block in the block size that the block size controller 140 is notified of. Then, an exemplary copy process of the virtual switch device 100 will be explained as compared with comparable examples.

FIG. 10 specifically illustrates an exemplary flow of a regular copy process of the second embodiment. FIG. 10 illustrates a regular procedure in which a copy process P1 and other processes P2 and P3 controlled by the virtual switch device 100 are run. The term "regular" used here means in an averagely loaded state.

The copy process P1 is a process in which data is copied from the storage device 200 to the storage device 300. The copy process P1 specifically represents a procedure since the virtual switch device 100 obtains a block from the storage device 200 and until the virtual switch device 100 finishes writing the block into the storage device 300.

The processes P2 and P3 are, e.g., host I/Os. The processes P2 and P3 may be copy processes for other data. The respective processes P1, P2 and P3 are scheduled by the virtual switch device 100 so as to be intermittently run in specific order. Procedures in which the respective processes are run will be explained below. These processes are run by the CPU 101 that the virtual switch device 100 is provided with.

The virtual switch device 100 runs the copy process P1, which is a copy process on a block-by-block basis. A block size in a regularly loaded state is the maximum block size X. The virtual switch device 100 finishes a copy process for the block by spending an amount of time Tu or less (ST1).

The virtual switch device 100 runs and finishes the process P2 (ST2). The virtual switch device 100 runs and finishes the process P3 (ST3). The virtual switch device 100 runs a copy process P1 of a next unit block.

The virtual switch device 100 finishes a copy process for the block by spending an amount of time Tu or less (ST4). The virtual switch device 100 runs and finishes the process P2 (ST5).

The virtual switch device 100 runs and finishes the process P3 (ST6). As a copy process for a block is finished by spending an amount of time Tu or less in this way, the respective blocks are successively copied in the maximum block size X.

FIG. 11 specifically illustrates a first exemplary flow of a copy process of the second embodiment. The copy process P1 and the other processes P2 and P3 are same as those illustrated in FIG. 10. The virtual switch device 100 runs the copy process P1, which is a copy process on a block-by-block basis. A current block size is indicated with N. The virtual switch device 100 finishes a copy process for the block by spending an amount of time longer than Tu. Then, the virtual switch device 100 changes the block size to one smaller than N for next time. The virtual switch device 100 specifically calculates K1=Tu/t (K1<1) by the use of the time t spent on the operation. Then, calculate N1=K1×N, and substitute N1 for N (ST11).

The virtual switch device 100 runs and finishes the process P2 (ST12). The virtual switch device 100 runs and finishes the process P3 (ST13). The virtual switch device 100 runs the copy process P1. The current block size is N being smaller than that at the ST11. The virtual switch device 100 finishes a copy process for the block by spending an amount of time longer than Tu. Then, the virtual switch device 100 changes the block size to one smaller than N for next time. The block size is specifically calculated similarly as at the ST11. The value N is thereby updated to a smaller value (ST14).

The virtual switch device 100 runs and finishes the process P2 (ST15). The virtual switch device 100 runs and finishes the process P3 (ST16). The virtual switch device 100 runs the copy process P1. The current block size is N being smaller than that at the ST14. The virtual switch device 100 finishes a copy process for the block by spending an amount of time shorter than Tu and longer than Tl (ST17).

The virtual switch device 100 runs and finishes the process P2 (ST18). The virtual switch device 100 runs and finishes the process P3 (ST19). The virtual switch device 100 changes the block size in this way, so that an amount of time spent on a block copy is Tu or shorter.

Figure 12:
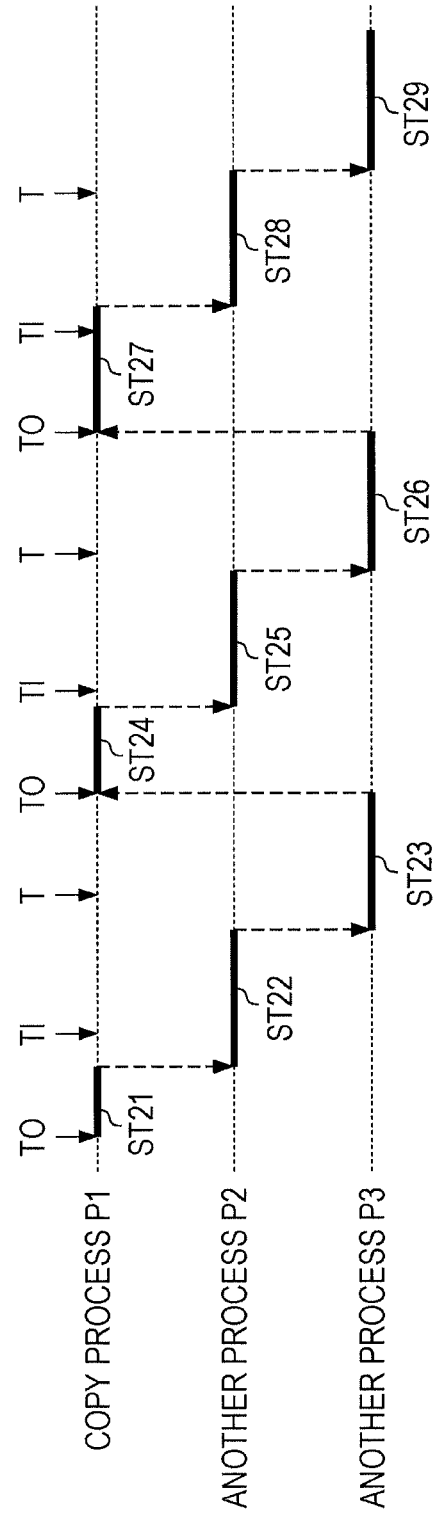
FIG. 12 specifically illustrates a second exemplary flow of a copy process of the second embodiment.

FIG. 12 specifically illustrates a second exemplary flow of a copy process of the second embodiment. The copy process P1 and the other processes P2 and P3 are same as those illustrated in FIG. 10. The virtual switch device 100 runs the copy process P1, which is a copy process on a block-by-block basis. The current block size is indicated with N. The virtual switch device 100 finishes a copy process for the block by spending an amount of time shorter than Tl. Then, the virtual switch device 100 changes the block size to one larger than N for next time. The virtual switch device 100 specifically calculates K2=Tl/t (K2>1) by the use of the time t spent on the operation. Then, calculate N2=K2×N, and substitute N2 for N (ST21).

The virtual switch device 100 runs and finishes the process P2 (ST22). The virtual switch device 100 runs and finishes the process P3 (ST23). The virtual switch device 100 runs the copy process P1. The current block size is N being larger than that at the ST21. The virtual switch device 100 finishes a copy process for the block by spending an amount of time shorter than Tl. Then, the virtual switch device 100 changes the block size to one larger than N for next time. The block size is specifically calculated similarly as at the ST21. The value N is thereby updated to a larger value (ST24).

The virtual switch device 100 runs and finishes the process P2 (ST25). The virtual switch device 100 runs and finishes the process P3 (ST26). The virtual switch device 100 runs the copy process P1. The current block size is N being larger than that at the ST24. The virtual switch device 100 finishes a copy process for the block by spending an amount of time longer than Tl and shorter than Tu (ST27).

The virtual switch device 100 runs and finishes the process P2 (ST28). The virtual switch device 100 runs and finishes the process P3 (ST29). The virtual switch device 100 changes the block size in this way, so that an amount of time spent on a block copy is Tl or longer.

Figure 13A:
FIGS. 13A, 13B and 13C are exemplary comparable flows of a copy process in a heavily loaded state.
Figure 13B:
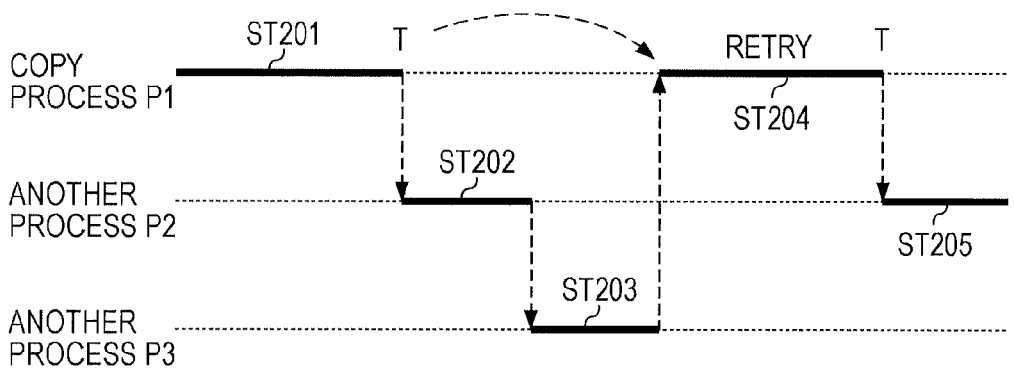
Figure 13C:
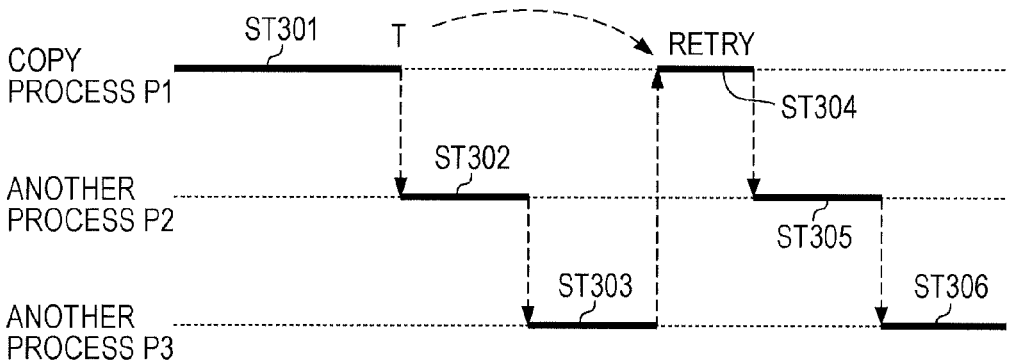

Then, examples to be compared with the copy process of the second embodiment will be explained. FIGS. 13A, 13B and 13C are exemplary comparable flows of a copy process in a heavily loaded state. The respective diagrams in FIGS. 13A to 13C exemplify cases where the method for the copy process of the second embodiment is not adopted. The copy process P1 and the other processes P2 and P3 are same as those illustrated in FIG. 10. Incidentally, a processing entity is merely indicated as a "virtual switch device" so as to be distinguishable from the virtual switch device 100.

FIG. 13A illustrates a case where no timeout is set in a block copy process. FIG. 13B illustrates a case where a timeout is set in a block copy process. FIG. 13C illustrates a case where a timeout is set in a block copy process and a method for reducing the block size after a timeout occurs.

No timeout is set in FIG. 13A. Thus, the virtual switch device runs neither the process P2 nor the process P3 until a copy of one block is finished in the copy process P1 (ST101). Thus, processing delays increase in the processes P2 and P3.

A timeout is set in FIG. 13B. The virtual switch device runs the copy process P1, which is a copy process for one block. The virtual switch device does not finish P1 in the timeout time T after starting the copy process for the block. Then, a timeout occurs, resulting in that the copy process P1 is interrupted (ST201). Then, the virtual switch device runs and finishes the process P2 (ST202). The virtual switch device runs and finishes the process P3 (ST203). The virtual switch device runs the copy process P1, which is a retry of the block copy at the ST201. The virtual switch device does not finish P1 in the timeout time T after starting the copy process of the block. Then, a timeout occurs, resulting in that the copy process P1 is interrupted (ST204). Then, the virtual switch device runs and finishes the process P2 (ST205).

Although the processes P2 and P3 are run in this way, timeouts repeatedly occur as long as the storage devices 200 and 300 being targets of the copy process P1 continuously remain in heavily loaded states.

In FIG. 13C, the virtual switch device makes the block size smaller than the current block size after a timeout occurs. The virtual switch device runs the copy process P1, which is a copy process for one block. Then, a timeout occurs, resulting in that the copy process P1 is interrupted (ST301). Then, the virtual switch device runs and finishes the process P2 (ST302). The virtual switch device runs and finishes the process P3 (ST303). The virtual switch device runs the copy process P1, which is a retry of the block copy at the ST301. At this time, the virtual switch device runs the copy process for the block in a block size made smaller than the last block size as a timeout occurred at the ST301 (ST304). Then, the virtual switch device runs and finishes the process P2 (ST305). The virtual switch device runs and finishes the process P3 (ST306).

Even if making the block size smaller after a timeout occurs in this way, the virtual switch device has to retry the copy at the ST301, resulting in that the copy processing time as long as a maximum of the timeout time is wasted. Further, if the storage devices 200 and 300 being targets of the copy process P1 continuously remain in heavily loaded states at the time of the retry, another timeout probably occurs again.

Any one of the comparable examples A to C wastes time in the copy process and is inefficient as described above. Meanwhile, the virtual switch device 100 changes the block size in advance in accordance with the time spent on a block copy. Thus, as being able to prevent a timeout from occurring and to cause a block copy to be retried less frequently, the virtual switch device 100 may efficiently run the copy process. Further, as being able to cause timeouts to occur less frequently, the virtual switch device 100 may reduce loads put on the storage devices.

Third Embodiment

A third embodiment will be explained in detail with reference to the drawings. Differences from the previously mentioned second embodiment will be mainly explained, and explanations of similar matters will be omitted.

According to the third embodiment, if a pre-timeout occurs in a certain logical unit in a certain storage device, a block size is changed for a copy process regarding another logical unit. A plurality of copy processes may thereby be made efficient. A virtual switch device which implements such a function will be specifically explained.

Incidentally, as an entire structure of a virtual storage system of the third embodiment is a same as that of the virtual storage system of the second embodiment which was explained with reference to FIG. 2, its explanation is omitted. They are different from each other, though, in that the virtual storage system of the third embodiment is provided with a virtual switch device 100a in lieu of the virtual switch device 100.

Further, as a hardware structure of the virtual switch device 100a of the third embodiment is a same as that of the virtual switch device 100 of the second embodiment which was explained with reference to FIG. 5, its explanation is omitted.

FIG. 14 illustrates a functional structure of the virtual switch device 100a of the third embodiment. The virtual switch device 100a has a control data memory unit 110a, a copy processing unit 120, a processing time measuring unit 130, a block size controller 140 and a change target detector 150. These functions are implemented by the CPU 101 running specific programs. These functions may be partially or entirely implemented by hardware components for exclusive use, though.

As functions of the copy processing unit 120, the processing time measuring unit 130 and the block size controller 140 mentioned here are same as those of the respective portions given the same reference numerals in the virtual switch device 100 illustrated in FIG. 5, their explanations are omitted.

The control data memory unit 110a corresponds to the control data memory unit 110 which was explained as to the second embodiment. The control data memory unit 110a further stores therein logical unit management data which defines logical unit structures in the storage devices 200, 300 and 400.

The change target detector 150 obtains an amount of time spent on a block copy of a certain copy process measured by the time measuring unit 130, refers to the logical unit management data stored in the control data memory unit 110a, and detects a copy process for which the block size may be changed. The change target detector 150 outputs copy process identification data which indicates a detected copy process to the block size controller 140. The block size controller 140 instructs the copy processing unit 120 to change the block size in a copy process corresponding to the copy process identification data obtained from the change target detector 150.

FIG. 15 illustrates an exemplary data structure in a logical unit management table of the third embodiment. The logical unit management table 111a is stored in the control data memory unit 110a in advance. The logical unit management table 111a is provided with columns indicating a number, a LUN, a port, a RAID group, a controller and a housing structure. Pieces of information forming a line in a horizontal direction across the respective columns are related to one another and indicate information regarding one logical unit.

Identification numbers for identifying records are set in the number column. LUNs are set in the LUN column. Identification data of ports corresponding to LUNs are set in the port column. Incidentally, the ports correspond to the communication ports of the communication units 231, 232, 233 and so forth. Identification data of RAID groups corresponding to LUNs are set in the RAID group column. Identification data of controllers corresponding to LUNs are set in the controller column. Incidentally, the term "controller" corresponds to the controllers 221, 222, 223 and so forth. Identification data of housing structures corresponding to LUNs are set in the housing structure column. Let identification data of a housing structure "001" indicate the storage device 200 in the following explanation. Further, let identification data of a housing structure "002" indicate the storage device 300. Further, let identification data of a housing structure "003" indicate the storage device 400.

A piece of information formed by, e.g., a number "1", a LUN "LUN1-1", a port "001-P00", a RAID group "1-R00", a controller "001-C00" and a housing structure "001" is set in the logical unit management table 111a.

The record of the number "1" indicates that the port "001-P00" and the controller "001-C00" are allotted to the LUN "LUN1-1" provided in the storage device 200, and further indicates that the LUN belongs to the RAID group "001-R00".

FIG. 16 illustrates an exemplary data structure in a copy process management table of the third embodiment. The change target detector 150 produces the copy process management table 112 and stores it in the control data memory unit 110a. The copy process management table 112 is provided with columns indicating a copy process identification number, copy conditions and a pre-timeout. Pieces of information forming a line in a horizontal direction across the respective columns are related to one another and indicate information regarding one copy process.

Identification data for identifying a copy process is set in the copy process identification number column. The identification data mentioned here is provided with an identifier which indicates one of a copy source and a copy destination. An identifier "S" (the first letter of Source) is specifically set to the copy source. Further, an identifier "D" (the first letter of Destination) is set to the copy destination. Data indicating circumstances related to the copy process is set in the copy conditions column. A LUN, a port number, a RAID group, a controller and a housing structure are indicated as exemplary copy conditions. Data indicating whether a pre-timeout has occurred in the copy process is set in the pre-timeout column.

A piece of information formed by, e.g., a copy identification number "S0001", a LUN "LUN1-1", a port "001-P00", a RAID group "1-R00", a controller "001-C00", a housing structure "001" and a pre-timeout "occurred" is set in the copy process management table 112.

That is, it is indicated that a pre-timeout has occurred in the copy process indicated by the copy process identification number "S0001". Further, it is indicated that the LUN "LUN1-1" of the storage device 200 is the copy source in the copy process. It is further indicated that the port "001-P00", the RAID group "001-R00" and the controller "001-C00" are used as circumstances related to the copy process.

Numeric portions of "S0001" and "D0001" are common here. It is indicated that a block obtained from the copy source in the process "S0001" is written into the copy destination in the process "D0001". That is, the processes "S0001" and "D0001" are joined and form one block copy. Further, whether a pre-timeout has occurred is detected for the both processes "S0001" and "D0001" together. Thus, if a pre-timeout has occurred, "occurred" is set in the pre-timeout column for both of them. If no pre-timeout has occurred, "not occurred" is set in the pre-timeout column for both of them. Similar relations are applied to the other copy process identification numbers.

A particular copy process will be sometimes specified and explained by the use of the copy process identification number, such as a copy process "S0001", in order that the explanation may be simplified. FIG. 17 illustrates an exemplary data structure in a priority table of the third embodiment. The priority table 113 is stored in the control data memory unit 110a in advance. The priority table 113 is referred to by the change target detector 150 and is used for a process for detecting a change target copy process. The priority table 113 is updated by the change target detector 150.

The priority table 113 is provided with columns of copy conditions, a point and a priority. Pieces of information forming a line in a horizontal direction across the respective columns are related to one another and indicate information regarding one of the copy conditions.

A type of each of the copy conditions set in the copy process management table 112 is set in the copy conditions column. A point obtained for the relevant copy condition is set in the point column. A priority of each of the copy conditions in accordance with the point is set in the priority column. Let a priority value being smaller indicate that a corresponding copy condition is of a higher priority. A "high priority" means that, in case of detecting a copy process being a block size change target, the relevant copy condition is given a priority for being selected.

A piece of information formed by, e.g., a copy condition "LUN", a point "5" and a priority "1" is set in the priority table 113. The point "5" is a highest value in the priority table 113. Thus, its priority is highest and the highest "priority "1" is given.

Then, a procedure in which the virtual switch device 100a configured as described above runs a process will be explained. Incidentally, as a copy process and a block size control process run by the copy processing unit 120 and the block size controller 140 are same as those of the second embodiment explained with reference to FIGS. 8 and 9, their explanations are omitted.

Figure 18:
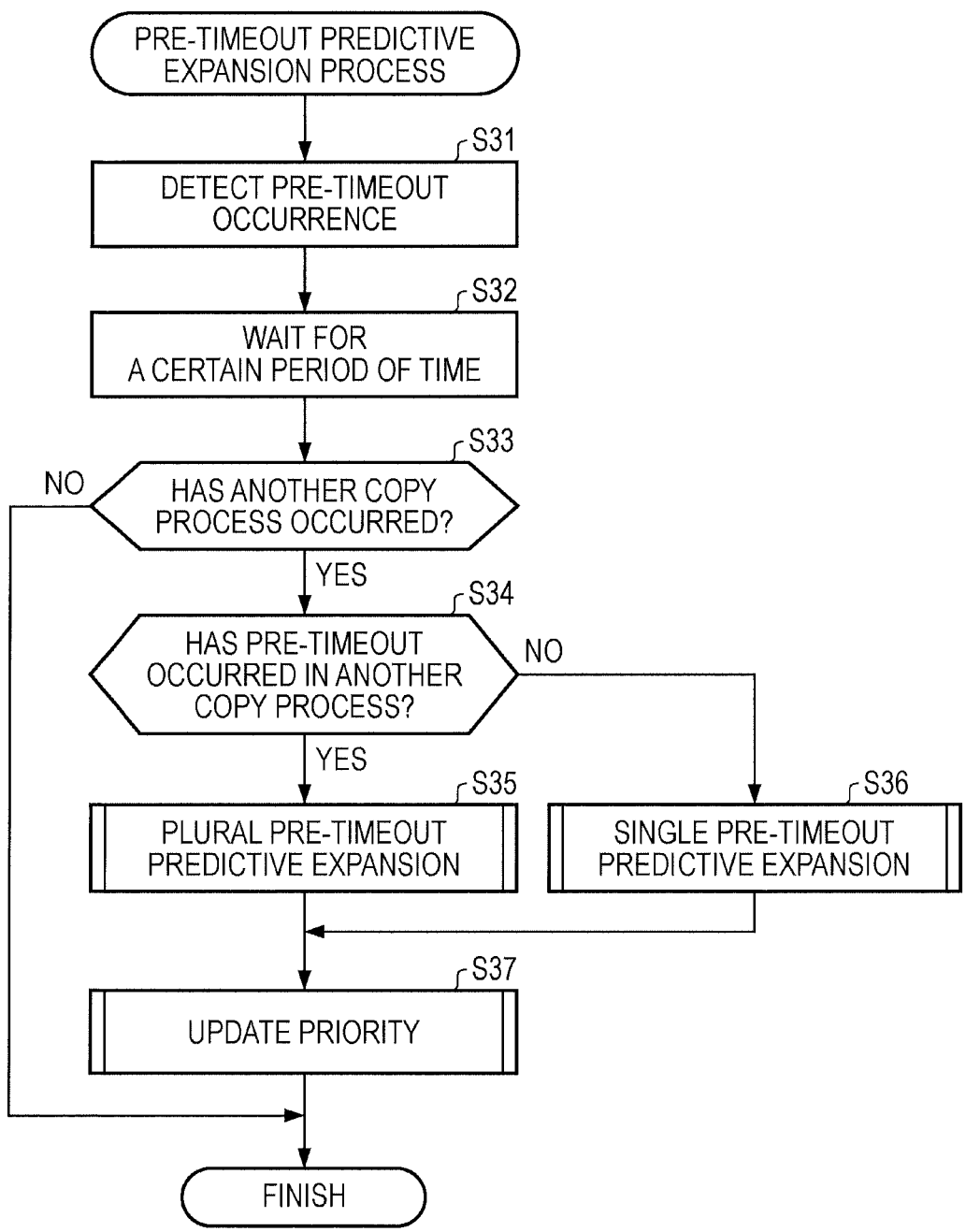
FIG. 18 is a flowchart which illustrates a pre-timeout predictive expansion process of the third embodiment.

FIG. 18 is a flowchart which illustrates a pre-timeout predictive expansion process of the third embodiment. The individual processes will be explained below in order of the operation numbers.

In operation S31, the change target detector 150 obtains a processing time measurement result measured by the processing time measuring unit 130 for a copy process run by the copy processing unit 120, and detects a pre-timeout occurrence in the copy process. Then, the change target detector 150 enters the pre-timeout occurrence on the copy process management table 112 as to the copy process. The respective condition values of the copy conditions may be obtained with reference to the logical unit management table 111a stored in the control data memory unit 110a on the basis of information on an LUN being set as a target of the copy process by the copy processing unit 120. Incidentally, in this case, the block size controller 140 changes the block size of the copy process in which the pre-timeout occurrence is detected as explained as to the second embodiment.

In operation S32, the change target detector 150 waits for a certain period of time. In the meantime, the change target detector 150 continues entry on the copy process management table 112 as to the respective copy processes run by the copy processing unit 120.

In operation S33, the change target detector 150 refers to the copy process management table 112, and identifies whether another copy process has occurred apart from the copy process in which the pre-timeout occurrence is detected at the S31. If another copy process has occurred, the change target detector 150 shifts the process to a S34. If no other copy process has occurred, the change target detector 150 finishes the process.

In operation S34, the change target detector 150 refers to the copy process management table 112, and identifies whether a pre-timeout has occurred in another copy process. If such a pre-timeout has occurred, the change target detector 150 shifts the process to a S35. If no such a pre-timeout has occurred, the change target detector 150 shifts the process to a S36.

In operation S35, the change target detector 150 runs a predictive expansion process for a block size change in case of an occurrence of plural pre-timeouts. The "occurrence of plural pre-timeouts" means that a pre-timeout is detected in another process apart from the copy process in which a pre-timeout is detected. That is, the predictive expansion process in this case means to select another copy process in which a pre-timeout has occurred and to change the block size in that copy process. The process will be described later in detail with reference to FIG. 19. Then, the change target detector 150 shifts the process to a S37.

In operation S36, the change target detector 150 runs a predictive expansion process for a block size change in case of an occurrence of a single pre-timeout. The "occurrence of a single pre-timeout" means that no pre-timeout is detected in another process apart from the copy process in which a pre-timeout is detected. That is, the predictive expansion process in this case means to select another copy process in which no pre-timeout has occurred and to change the block size in that copy process as well. The process will be described later in detail with reference to FIG. 22. Then, the change target detector 150 shifts the process to the S37.

In operation S37, the change target detector 150 updates the priority table 113 stored in the control data memory unit 110. The change target detector 150 changes, in case of detecting a pre-timeout in a certain copy process, a block size in another copy process in this way.

Incidentally, while the change target detector 150 waits for a certain period of time at the above S32, the block size controller 140 may suspend a change of the block size. Then, the predictive expansion process in case of an occurrence of plural pre-timeouts indicated at the above S35 will be explained.

Figure 19:
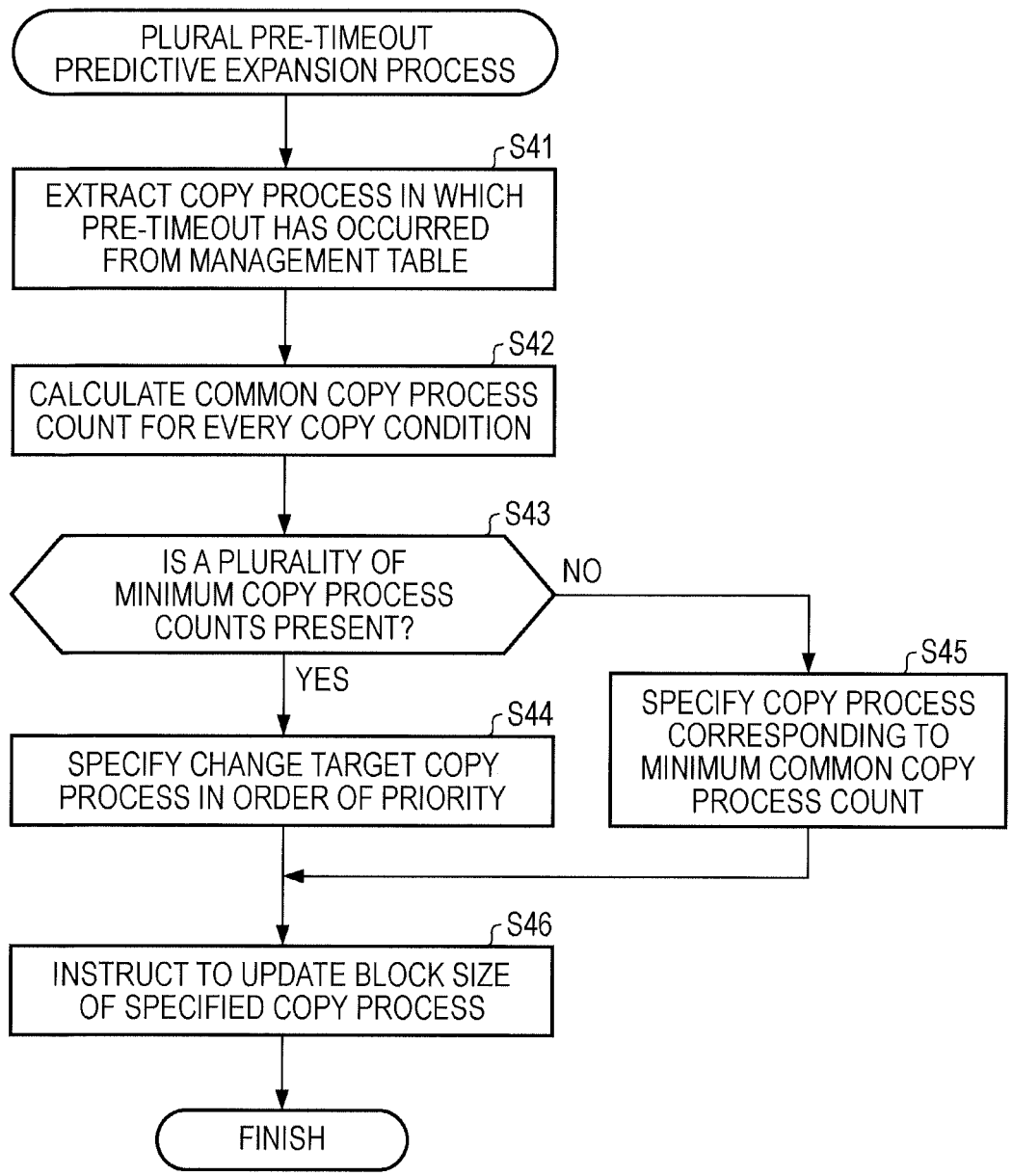
FIG. 19 is a flowchart which illustrates a plural pre-timeout predictive expansion process of the third embodiment.

FIG. 19 is a flowchart which illustrates a plural pre-timeout predictive expansion process of the third embodiment. The individual processes will be explained below in order of the operation numbers.

In operation S41, the change target detector 150 refers to the copy process management table 112 stored in the control data memory unit 110a, and extracts a copy process in which a pre-timeout has occurred. A result of the extraction is a copy process extraction table described later with reference to FIG. 20.

In operation S42, the change target detector 150 calculates a common copy process count for every one of the copy conditions. The common copy process count is the total number of copy processes each including a same value for one of the copy conditions being paid attention to. If no other copy process includes the same copy condition value, e.g., the common copy process count is "1". Further, if another and only one copy process includes the same copy condition value, the common copy process count is "2". Further, if a plurality of common copy process counts is calculated for one of the copy conditions, a maximum value of the plural common copy process counts is adopted as the common copy process count.

In operation S43, the change target detector 150 specifies a minimum one of the common copy process counts (excluding "1") calculated for the respective copy conditions (called the minimum copy process count, hereafter). The change target detector 150 identifies whether a plurality of minimum copy process counts is present. If a plurality of them is present, the change target detector 150 shifts the process to a S44. If only one minimum copy process count is present, the change target detector 150 shifts the process to a S45.

In operation S44, the change target detector 150 refers to the priority table 113 stored in the control data memory unit 110a, and specifies one of the copy conditions corresponding to the respective minimum copy process counts of the highest priority. Then, the change target detector 150 specifies a copy process including the copy condition value referred to when the minimum copy process count is calculated as to the specified copy condition, and shifts the process to a S46.

In operation S45, the change target detector 150 specifies a copy process including the copy condition value referred to when the minimum copy process count is calculated, and shifts the process to the S46.

In operation S46, the change target detector 150 instructs the block size controller 140 to change the block size in the copy process specified at the S44 or S45. The block size controller 140 instructs the copy processing unit 120 to copy data in a same block size as the block size determined at the S31 illustrated in FIG. 18 as to the copy process instructed by the change target detector 150. The copy processing unit 120 changes the block size in the instructed copy process.

Upon detecting a pre-timeout in a certain copy process, the change target detector 150 changes a block size in another copy process in which a pre-timeout occurs afterwards as well.

In a case where plural copy processes are run in parallel, a timeout may thereby be more efficiently prevented from occurring in each of the copy processes. As a result, the loads put on the respective storage devices may be reduced, and a copy process for each of the storage devices may be more efficiently run.

Incidentally, why the virtual switch device 100a does not change a block size in every other copy process in which a pre-timeout has occurred is to confine an effect caused by the block size reduction as much as possible. That is, in order to reduce its effect on the entire copy processes by confining degradation of copy performance caused by the block size reduction in as few copy processes as possible.

Further, the change target detector 150 may detect a block size change target only in copy processes each including a same copy condition value as in the copy process in which a pre-timeout is detected first in the plural pre-timeout predictive expansion process as well, similarly as in the single pre-timeout predictive expansion process described later.

The plural pre-timeout predictive expansion process will be explained below while an exemplary copy process extraction table is specifically being illustrated. FIG. 20 specifically illustrates a first exemplary copy process extraction table of the third embodiment. The change target detector 150 produces a copy process extraction table 112a and stores it in the control data memory unit 110a. The change target detector 150 refers to the pre-timeout column in the copy process management table 112 stored in the control data memory unit 110a, and extracts a record to which pre-timeout "occurred" is set, so as to produce the copy process extraction table 112a. As each of columns provided in the copy process extraction table 112a is a same as the corresponding one provided in the copy process management table 112, its explanation is omitted.

The change target detector 150 calculates a common copy process count on the basis of the copy process extraction table 112a. The copy process extraction table 112a is an example in a case where the change target detector 150 runs the processes of the operations S42, S43 and S45 as explained with reference to FIG. 19. Incidentally, let a copy process in which a pre-timeout is detected first be a copy process corresponding to the copy process identification numbers "S0001" and "D0001".

The change target detector 150 refers to the copy process extraction table 112a at first, and calculates a common copy process count for every copy condition (S42). The calculation is specifically as follows.

(1) No copy processes share a same copy condition value for the copy condition "LUN" with one another. Thus, the common copy process count is "1".

(2) Three copy processes include a copy condition value "001-P00" in common for the copy condition "port". Further, two copy processes include a copy condition value "002-P00" in common. Let the larger one be the common copy process count, which is thus "3".

(3) Two copy processes include a copy condition value "001-R00" in common for the copy condition "RAID group". Thus, the common copy process count is "2".

(4) No copy processes share a same copy condition value for the copy condition "controller" with one another. Thus, the common copy process count is "1".

(5) Four copy processes include a copy condition value "001" in common for the copy condition "housing structure". Further, four copy processes include a copy condition value "002" in common. Thus, the common copy process count is "4".

The change target detector 150 specifies a minimum value of the common copy process counts excluding one, i.e., the minimum common copy process count, on the basis of a result calculated above. The change target detector 150 identifies whether the minimum common copy process count is found for a plurality of the copy conditions (S43). The minimum common copy process count of the above example is "2", and is not found for a plurality of the copy conditions.

Thus, the change target detector 150 specifies, for the copy condition "RAID group" corresponding to the minimum common copy process count "2", the copy processes "S0001" and "S0002" including the copy condition value "001-R00" that the change target detector 150 has referred to so as to calculate the common copy process count (S44). The change target detector 150 instructs the block size controller 140 to change the block size in the copy process "S0002" (and in the paired process "D0002") as well (S46).

Why the change target detector 150 does not instruct the block size controller 140 to change the block size in the copy process "S0001" at this time is as follows. That is, the copy process corresponding to "S0001" is the one in which a pre-timeout has been detected first, and the block size controller 140 has already changed the block size.

FIG. 21 specifically illustrates a second exemplary copy process extraction table of the third embodiment. The change target detector 150 produces a copy process extraction table 112b and stores it in the control data memory unit 110a. A method for producing the copy process extraction table 112b is a same as the method for producing the copy process extraction table 112a. As each of columns provided in the copy process extraction table 112b is a same as the corresponding one provided in the copy process management table 112, its explanation is omitted.

The change target detector 150 calculates a common copy process count on the basis of the copy process extraction table 112b. The copy process extraction table 112b is an example in a case where the change target detector 150 runs the processes of the operations S42, S43 and S44 as explained with reference to FIG. 19. Incidentally, let the copy process in which a pre-timeout is detected first be a copy process corresponding to the copy process identification numbers "S0011" and "D0011".

The change target detector 150 refers to the copy process extraction table 112b at first, and calculates a common copy process count for every copy condition (S42). The calculation is specifically as follows.

(1) No copy processes share a same copy condition value for the copy condition "LUN" with one another. Thus, the common copy process count is "1".

(2) Two copy processes include a copy condition value "002-P00" in common for the copy condition "port". Thus, the common copy process count is "2".

(3) Two copy processes include a copy condition value "003-R00" in common for the copy condition "RAID group". Further, two copy processes include a copy condition value "003-R01" in common. Thus, the common copy process count is "2".

(4) No copy processes share a same copy condition value for the copy condition "controller" with one another. Thus, the common copy process count is "1".

(5) Four copy processes include a copy condition value "002" in common for the copy condition "housing structure". Further, four copy processes include a copy condition value "003" in common. Thus, the common copy process count is "4".

The change target detector 150 specifies a minimum value of the common copy process counts excluding one, i.e., the minimum common copy process count, on the basis of a result calculated above. The change target detector 150 identifies whether the minimum common copy process count is found for a plurality of the copy conditions (S43). The minimum common copy process count of the above example is "2", and is found for a plurality of the copy conditions.

Thus, the change target detector 150 refers to the priority table 113 stored in the control data memory unit 110a, and specifies one of the higher priority of the copy conditions "port" and "RAID group" corresponding to the minimum common copy process count "2". Between the copy conditions "port" and "RAID group" in the priority table 113, e.g., the priority of "port" is higher than that of "RAID group". Thus, the change target detector 150 specifies the copy condition "port" as the one of the higher priority.

Thus, the change target detector 150 specifies, for the copy condition "port", the copy processes "S0011" and "S0012" including the copy condition value "002-P00" that the change target detector 150 has referred to so as to calculate the common copy process count. The change target detector 150 instructs the block size controller 140 to change the block size in the copy process "S0012" (and in the paired process "D0012") as well (S46).

Why the change target detector 150 does not instruct the block size controller 140 to change the block size in the copy process "S0011" at this time is as follows. That is, the copy process corresponding to "S0011" is the one in which a pre-timeout has been detected first, and the block size controller 140 has already changed the block size.

Then, the predictive expansion process in case of an occurrence of a single pre-timeout indicated at the S36 in FIG. 18 will be explained.

Figure 22:
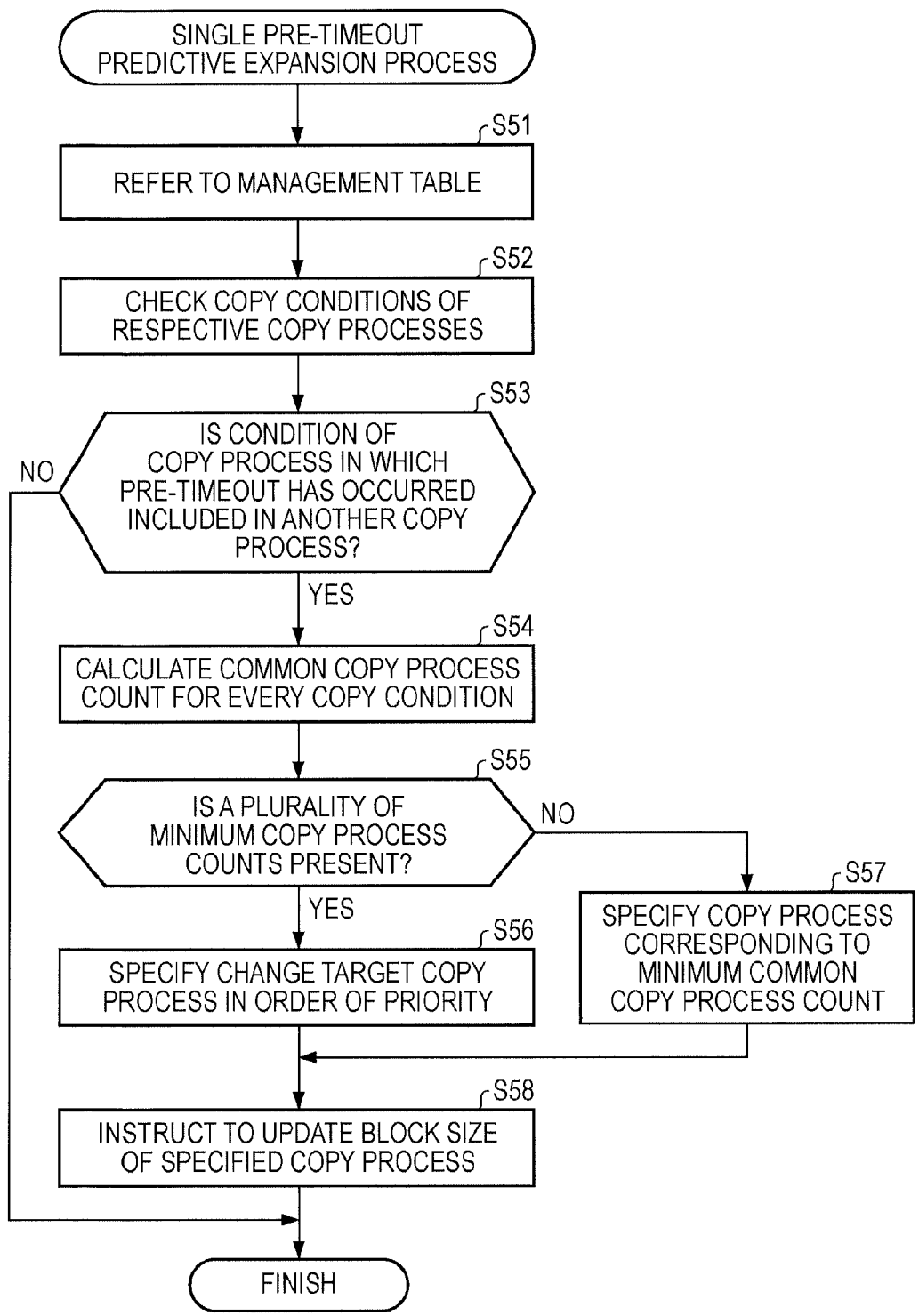
FIG. 22 is a flowchart which illustrates a single pre-timeout predictive expansion process of the third embodiment.

FIG. 22 is a flowchart which illustrates a single pre-timeout predictive expansion process of the third embodiment. The individual processes will be explained below in order of the operation numbers.

In operation S51, the change target detector 150 refers to the copy process management table 112 stored in the control data memory unit 110a, and extracts all copy processes. A result of the extraction is a copy process extraction table described later with reference to FIG. 23.

In operation S52, the change target detector 150 refers to the copy process extraction table and checks copy conditions of the respective copy processes.

In operation S53, the change target detector 150 identifies whether a copy condition value of a copy process in which a pre-timeout has occurred is included in another copy process. If the identification is positive, the change target detector 150 shifts the process to a S54. If the identification is negative, the change target detector 150 finishes the process.

In operation S54, the change target detector 150 calculates a common copy process count for every one of the copy conditions. A method for calculating the common copy process count is a same as the method explained at the S42 in FIG. 19. They are different from each other, though, in that at the S54 the change target detector 150 calculates a common copy process count only among the copy processes including the same copy condition value as that included in the copy process in which a pre-timeout has occurred.

In operation S55, the change target detector 150 specifies a minimum value of the common copy process counts (excluding "1") calculated for the respective copy conditions. The change target detector 150 identifies whether the minimum common copy process count is found for a plurality of the copy conditions. If it is found for a plurality of the copy conditions, the change target detector 150 shifts the process to a S56. If it is found for one copy condition, the change target detector 150 shifts the process to a S57.

In operation S56, the change target detector 150 refers to the priority table 113 stored in the control data memory unit 110a, and specifies one of the copy conditions corresponding to the respective minimum copy process counts of the highest priority. Then, the change target detector 150 specifies a copy process including the copy condition value referred to when the minimum copy process count is calculated as to the specified copy condition, and shifts the process to a S58.

In operation S57, the change target detector 150 specifies a copy process including the copy condition value referred to when the minimum copy process count is calculated, and shifts the process to the S58.

In operation S58, the change target detector 150 instructs the block size controller 140 to change the block size in the copy process specified at the S56 or S57. The block size controller 140 instructs the copy processing unit 120 to copy data in a same block size as the block size determined at the S31 illustrated in FIG. 18 as to the copy process instructed by the change target detector 150. The copy processing unit 120 changes the block size in the instructed copy process.

Upon detecting a pre-timeout in a certain copy process in this way, the change target detector 150 changes the block size in another copy process which includes a same copy condition value as that included in the copy process of the detected pre-timeout, as well.

In a case where plural copy processes are run in parallel, a pre-timeout which could possibly occur in a copy process even if no pre-timeout has occurred in another copy process may thereby be prevented. A reason why is that, in circumstances of a copy process in which a pre-timeout has occurred, the respective resources (a disk, a controller, a port, etc.) forming the circumstances are conceivably heavily loaded, and that a pre-timeout conceivably probably occurs afterwards in a copy process being run in the same circumstances.

As a result, the loads put on the respective storage devices may be reduced, and a copy process for each of the storage devices may be more efficiently run. The single pre-timeout predictive expansion process will be explained below while an exemplary copy process extraction table is specifically being illustrated.

FIG. 23 specifically illustrates an exemplary copy process extraction table of the third embodiment. The change target detector 150 produces a copy process extraction table 112c and stores it in the control data memory unit 110a. Incidentally, the copy process extraction table 112c includes same contents as those in the copy process management table 112, it is unnecessary to provide the both tables separately. As each of columns provided in the copy process extraction table 112c is a same as the corresponding one provided in the copy process management table 112, its explanation is omitted.

The change target detector 150 calculates a common copy process count on the basis of the copy process extraction table 112c. The copy process extraction table 112c is an example in a case where the change target detector 150 runs the processes of the operations S53, S54, S55 and S56 as explained with reference to FIG. 22.

Further, let the copy process in which a pre-timeout is detected be a copy process corresponding to the copy process identification numbers "S0001" and "D0001". In the copy process extraction table 112c, then, records of processes to be paired with each other are consecutively put so that the relationship between data acquisition (indicated with a copy process identification number starting with "S") and writing acquired data (indicated with a copy process identification number starting with "D") may be easily understood.

The change target detector 150 refers to the copy process extraction table 112c at first, and identifies whether there is a copy process including a same copy condition value that a copy process in which a pre-timeout is detected includes (S53), specifically as follows.

Refer to the copy condition "RAID group" of the copy process indicated with "S0001", so as to find out that its copy condition value is "001-R00". The copy process "D0002" includes the same copy condition value that the copy process "S0001" includes. Further, refer to the copy condition "housing structure" of the copy process indicated with "S0001", so as to find out that its copy condition value is "001". The copy process "D0002" includes the same copy condition value that the copy process "S0001" includes. Further, refer to the copy condition "housing structure" of the copy process indicated with "D0001", so as to find out that its copy condition value is "002". The copy process "S0003" includes the same copy condition value that the copy process "D0001" includes.

Thus, the change target detector 150 identifies that there is a copy process including a same copy condition value that a copy process in which a pre-timeout is detected includes. Then, the change target detector 150 refers to the copy process extraction table 112c, and calculates a common copy process count for every copy condition (S54), specifically as follows.

(1) The copy condition values of the copy condition "LUN" corresponding to the copy processes "S0001" and "D0001" are "LUN1-1" and "LUN2-1", respectively. Meanwhile, no other copy process includes "LUN1-1" or "LUN2-1", either. Thus, the common copy process count is "1".

(2) The copy condition values of the copy condition "port" corresponding to the copy processes "S0001" and "D0001" are "001-P00" and "002-P00", respectively. Meanwhile, no other copy process includes "001-P00" or "002-P00", either. Thus, the common copy process count is "1".

(3) The copy condition values of the copy condition "RAID group" corresponding to the copy processes "S0001" and "D0001" are "001-R00" and "002-R00", respectively. In this case, the copy process "D0002" includes the copy condition value "001-R00". Thus, the common copy process count is "2".

(4) The copy condition values of the copy condition "controller" corresponding to the copy processes "S0001" and "D0001" are "001-C00" and "002-C00", respectively. Meanwhile, no other copy process includes "001-C00" or "002-C00", either. Thus, the common copy process count is "1".

(5) The copy condition values of the copy condition "housing structure" corresponding to the copy processes "S0001" and "D0001" are "001" and "002", respectively. In this case, the copy process "D0002" includes the copy condition value "001", and the copy process "S0003" includes the copy condition value "002". That is, the common copy process count is "2" for both "001" and "002". Thus, the common copy process count of the relevant copy condition is "2".

The change target detector 150 specifies a minimum value of the common copy process counts excluding one, i.e., the minimum common copy process count, on the basis of a result calculated above. The change target detector 150 identifies whether the minimum common copy process count is found for a plurality of the copy conditions (S55). The minimum common copy process count of the above example is "2", which is found for a plurality of the copy conditions "RAID group" and "housing structure".

Thus, the change target detector 150 refers to the priority table 113 stored in the control data memory unit 110a, and specifies one of the copy conditions "RAID group" and "housing structure" corresponding to the minimum copy process count "2" of the highest priority. As to the copy conditions "RAID group" and "housing structure" in the priority table 113, e.g., "RAID group" is of the highest priority. Thus, the change target detector 150 specifies the copy condition "RAID group" as the one of the highest priority.

Further, the change target detector 150 specifies, for the copy condition "RAID group", the copy process "D0002" including the copy condition value "001-R00" that the change target detector 150 has referred to so as to calculate the common copy process count. The change target detector 150 instructs the block size controller 140 to change the block size in the copy process "S0002" (and in the paired process "D0002") as well (S58).

Why the change target detector 150 does not instruct the block size controller 140 to change the block size in the copy process "S0001" at this time is as follows. That is, the copy process corresponding to "S0001" is the one in which a pre-timeout has been detected first, and the block size controller 140 has already changed the block size.

Figure 24:
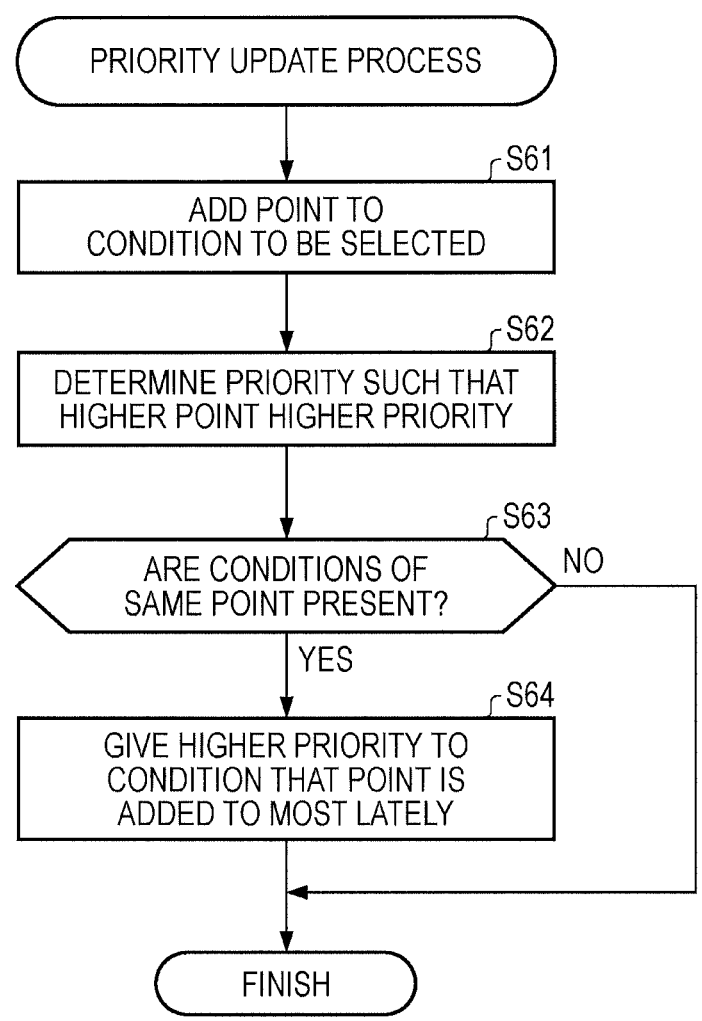
FIG. 24 is a flowchart which illustrates a priority update process of the third embodiment.

Then, the priority update process indicated at the S37 in FIG. 18 will be explained. FIG. 24 is a flowchart which illustrates a priority update process of the third embodiment. The individual processes will be explained in order of the operation numbers.

In operation S61, the change target detector 150 obtains the priority table 113 stored in the control data memory unit 110a. The change target detector 150 adds a point to a copy condition being a selection target. The term copy condition being a selection target means a copy condition having been compared with another copy condition by the use of the priority table 113. The change target detector 150 adds one point to the relevant copy condition. The point column is thereby updated in the priority table 113.

In operation S62, the change target detector 150 determines a priority on the basis of values of the points set on the priority table 113. The change target detector 150 specifically updates the priority column in the priority table 113 in such a way that a copy condition given more points is given a higher priority.

In operation S63, the change target detector 150 identifies whether another copy condition given the same value of the points is present. If present, the change target detector 150 shifts the process to a S64. If not present, the change target detector 150 finishes the process.

In operation S64, the change target detector 150 raises the priority of the copy condition that a point is lately added to. The change target detector 150 updates the priority table 113 every time running a pre-timeout predictive expansion process.

FIG. 25 specifically illustrates an exemplary priority update process of the third embodiment. Priority tables 113, 113a and 113b indicate before, in the middle of and after an update, respectively.

Assume that the change target detector 150 compares priorities among the copy conditions "port", "RAID group" and "housing structure" when running a pre-timeout predictive expansion process in a state indicated in the priority table 113. Then, the change target detector 150 adds one to the points of the respective copy conditions. Thus, the points of "port", "RAID group" and "housing structure" are made "5", "4" and "2", respectively (S61).

The change target detector 150 determines a priority on the basis of the points of the respective copy conditions calculated in this way (S62). There are specifically two copy conditions "LUN" and "port" for which the point value is the maximum "5". Thus, the change target detector 150 sets the highest priority "1" to the two copy conditions "LUN" and "port".

Further, there is a copy condition "RAID group" for which the point value is the second maximum "4". Thus, the change target detector 150 gives "RAID group" the priority "3". Why not to give the priority "2" is that there are two copy conditions of the priority "1".

Further, there are two copy conditions "controller" and "housing structure" for which the point values are the minimum "2". Thus, the change target detector 150 gives the two copy conditions "controller" and "housing structure" the lowest priority "4". Then, the priority table 113a is consequently obtained.

There are copy conditions of same point values in the priority table 113a (S63). Thus, the change target detector 150 raises the priority of one of the copy conditions of the same point value that a point is lately added to (S64). To put it specifically, add a point to the copy condition "port" this time, so that the points of "LUN" and "port" are of a same value. Thus, the change target detector 150 changes the priority of "LUN" from "1" to "2" so that the priority of "port" turns relatively higher. Similarly, add a point to the copy condition "housing structure" this time, so that the points of "controller" and "housing structure" are of a same value. Thus, the change target detector 150 changes the priority of "controller" from "4" to "5" so that the priority of "housing structure" turns relatively higher. Then, the priority table 113b is consequently obtained.

Update the priority table 113 in this way, so that a copy process including a copy condition for which a pre-timeout seems to be likely to occur may be easily specified.

Fourth Embodiment

A fourth embodiment will be explained in detail with reference to the drawings. Differences from the second and third embodiments previously described will be mainly explained, and explanations of similar matters will be omitted.

The fourth embodiment is provided with following functions in addition to those of the third embodiment. That is, to detect a copy process for which an amount of time spent on a block copy changes in a way close to that of a copy process in which a pre-timeout has occurred, in order to specify a block size change target in a predictive expansion process in case of a pre-timeout occurrence. Thus, a copy process in which a pre-timeout or a timeout probably occurs may be precisely detected. A virtual switch device to implement such a function will be specifically explained below.

Incidentally, as an entire structure of a virtual storage system of the fourth embodiment is a same as that of the virtual storage system of the second embodiment which was explained with reference to FIG. 2, its explanation is omitted. They are different from each other, though, in that the virtual storage system of the fourth embodiment is provided with a virtual switch device 100b in lieu of the virtual switch device 100.

Further, as a hardware structure of the virtual switch device 100b of the fourth embodiment is a same as that of the virtual switch device 100 of the second embodiment which was explained with reference to FIG. 5, its explanation is omitted.

Figure 26:
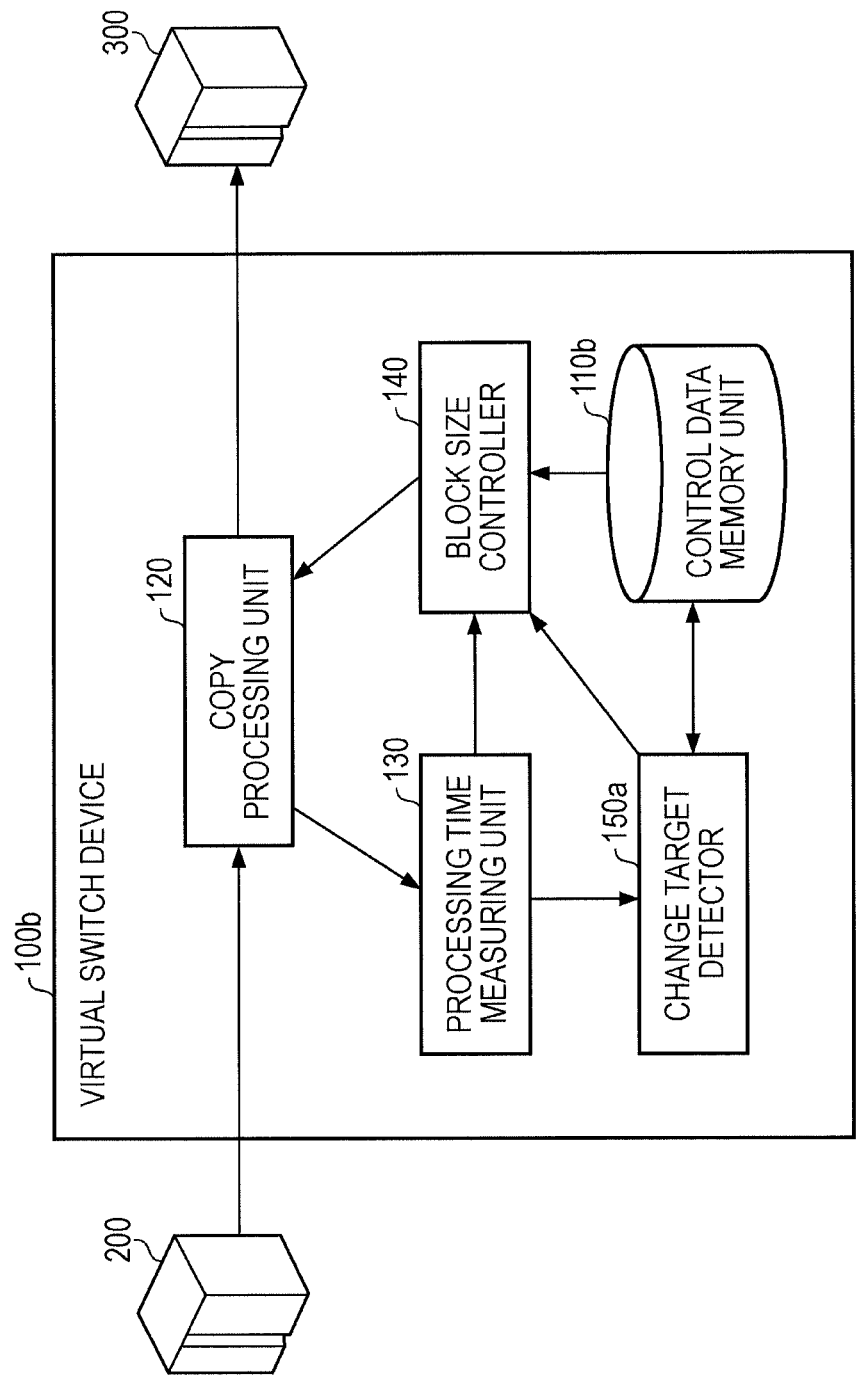
FIG. 26 illustrates a functional structure of a virtual switch device of a fourth embodiment.

FIG. 26 illustrates a functional structure of the virtual switch device of the fourth embodiment. The virtual switch device 100b has a control data memory unit 110b, a copy processing unit 120, a processing time measuring unit 130, a block size controller 140 and a change target detector 150a. These functions are implemented by the CPU 101 running specific programs. These functions may be partially or entirely implemented by hardware components for exclusive use, though.

As functions of the copy processing unit 120, the processing time measuring unit 130 and the block size controller 140 mentioned here are same as those of the respective portions given the same reference numerals in the virtual switch device 100 illustrated in FIG. 5, their explanations are omitted.

The control data memory unit 110b corresponds to the control data memory units 110 and 110a which were explained as to the second and third embodiments, respectively. The control data memory unit 110a further stores therein history data of the respective copy processes. The change target detector 150a corresponds to the change target detector 150 which was explained as to the third embodiment. That is, the change target detector 150a obtains an amount of time spent on a block copy of a certain copy process measured by the time measuring unit 130, refers to the logical unit management data stored in the control data memory unit 110b, and detects a copy process for which the block size may be changed. The change target detector 150a outputs copy process identification data which indicates a detected copy process to the block size controller 140. The block size controller 140 instructs the copy processing unit 120 to change the block size in a copy process corresponding to the copy process identification data obtained from the change target detector 150a.

The change target detector 150a is different from the change target detector 150 as follows. That is, the change target detector 150a detects a copy process in which a pre-timeout has occurred, and then detects a copy process for which an amount of time spent on a block copy changes in a way close to that of the previously detected copy process when running a single pre-timeout predictive expansion process.

FIG. 27 illustrates an exemplary data structure in a spent time history table of the fourth embodiment. The change target detector 150a produces a spent time history table 114 and stores it in the control data memory unit 110b. The spent time history table 114 is provided with a column for a copy process identification number and history columns as to how much time was spent every time. Pieces of information forming a line in a horizontal direction across the respective columns are related to one another and indicate history information regarding one copy process.

A piece of information for identifying a copy process is set in the copy process identification number column. Incidentally, first letters "S" or "D" indicating block acquisition from a copy source or block writing into a copy destination are not added in the spent time history table 114. A reason why is that an amount of time that the copy processing unit 120 spends on a certain block copy is since starting to acquire a block from the copy source and until finishing writing the block into the copy destination, and that it is unnecessary to handle those respective processes separately. An amount of time spent on block copies in the past as many as a certain number of times is set (in seconds) in the history columns as to how much time was spent every time. The "0-th" column includes latest records. The "−9-th" column includes oldest records in the table.

In the row of the copy process identification number "0001" in the spent time history table 114, e.g., data of the spent time such as "1.1" seconds, "2.1" seconds, "3.1" seconds, "3.2" seconds, "2.3" seconds, "1.2" seconds, "2.3" seconds, "3.2" seconds, "4.3" seconds and "7.2" seconds is set for the respective numbers of times indicated with "−9"–"0", respectively.

FIG. 28 illustrates an exemplary data structure in a ratio table of the fourth embodiment. The change target detector 150a produces a ratio table 115 and stores it in the control data memory unit 110b. The ratio table 115 is provided with a column for a copy process identification number and columns for ratios to previous times. Pieces of information forming a line in a horizontal direction across the respective columns are related to one another and indicate information regarding one copy process.

A piece of information for identifying a copy process is set in the copy process identification number column. Data as to how much time was spent each time is set in terms of ratios to previous times in the ratios to previous times columns.

In the row of the copy process identification number "0001" in the ratio table 115, e.g., data of the ratios to previous times such as "–", "1.91", "1.48", "1.03", "0.72", "0.52", "1.92", "1.39", "1.34" and "1.67" is set for the respective numbers of times indicated with "–9"–"0", respectively. The entry "–(no setting)" for the number of times "–9" means that no ratio to the previously spent time may be obtained as the history data before that time has been discarded. Further, the entry "1.91" for the number of the times "–8" is a ratio of the spent time "2.1" seconds for the number of the times "–8" to the spent time "1.1" seconds for the number of the times "–9" (2.1/1.1=1.91), both illustrated in the spent time history table 114. The ratios for the other numbers of times are similarly calculated.

FIG. 29 illustrates an exemplary data structure in a difference table of the fourth embodiment. The change target detector 150a produces a difference table 116 and stores it in the control data memory unit 110b. The difference table 115 is provided with a column for a copy process identification number, columns for differences from what is comparable and a sum column. Pieces of information forming a line in a horizontal direction across the respective columns are related to one another and indicate information regarding one copy process.

A piece of information for identifying a copy process is set in the copy process identification number column. Data of an absolute value of a difference between the ratio for each time set in the ratio table 115 and the relevant ratio in the copy process in which a pre-timeout has occurred is set in each of the columns for differences from what is comparable. A sum of the absolute values of the differences included in the record is set in the sum column.

In the row of the copy process identification number "0001" in the difference table 116, e.g., data of the absolute values of the differences from what is comparable such as "–", "0", "0", . . . "0" is set for the respective numbers of times indicated by "–9"–"0", respectively, and their sum "0" is set. This means that the copy process in which a pre-timeout has occurred is indicated with "0001". To put it specifically, subtractions for the record of the copy process identification number "0001" such as "–(no setting)", "1.91–1.91=0", "1.48–1.48=0", . . . , for the number of times "–9", "–8", "–7", . . . , respectively, are set. Further, the sum "0" is a sum of the absolute values of the differences of the record of the copy process identification number "0001" in the difference table 116.

In the row of the copy process identification number "0002" in the difference table 116, e.g., data of the absolute values of the differences from what is comparable such as "–", "0.91", "0.52", "0.03", "0.78", "0.48", "1.25", "0.39", "0.21" and "1.00" is set for the respective numbers of times indicated with "–9"–"0", respectively, and their sum "4.73" is set.

These are absolute values of the differences of the respective times between the ratios included in the record of the copy process identification number "0001" and the ratios included in the record of the copy process identification number "0002", both in the ratio table 115. To put it specifically, what is reflected by "–(no setting)" for the number of times "–9" and subtractions such as "1.91–1.00=0.91", "1.48–2.00=–0.52", "1.03–1.00=0.03", . . . , for the number of times "–8", "–7", "–6", respectively, are set. Further, the sum "4.73" is a sum of the absolute values of the differences of the record of the copy process identification number "0002" in the difference table 116.

Then, a procedure for processing data by means of the virtual switch device 100b provided with the structure described above will be explained. As the copy process and the block size control process run by the copy processing unit 120 and the block size controller 140, respectively, are same as the copy process and the block size control process of the second embodiment, respectively, explained with reference to FIGS. 8 and 9, their explanations are omitted. Further, as the pre-timeout predictive expansion process and the plural pre-timeout predictive expansion process run by the change target detector 150a are same as the pre-timeout predictive expansion process and the plural pre-timeout predictive expansion process of the third embodiment, respectively, explained with reference to FIGS. 18 and 19, their explanations are omitted.

Further, assume that the change target detector 150a obtains an amount of time spent on block copies in the past as many as a certain number of times for the respective copy processes, and records what is obtained in the spent time history table 114 stored in the control data memory unit 110b.

Figure 30:
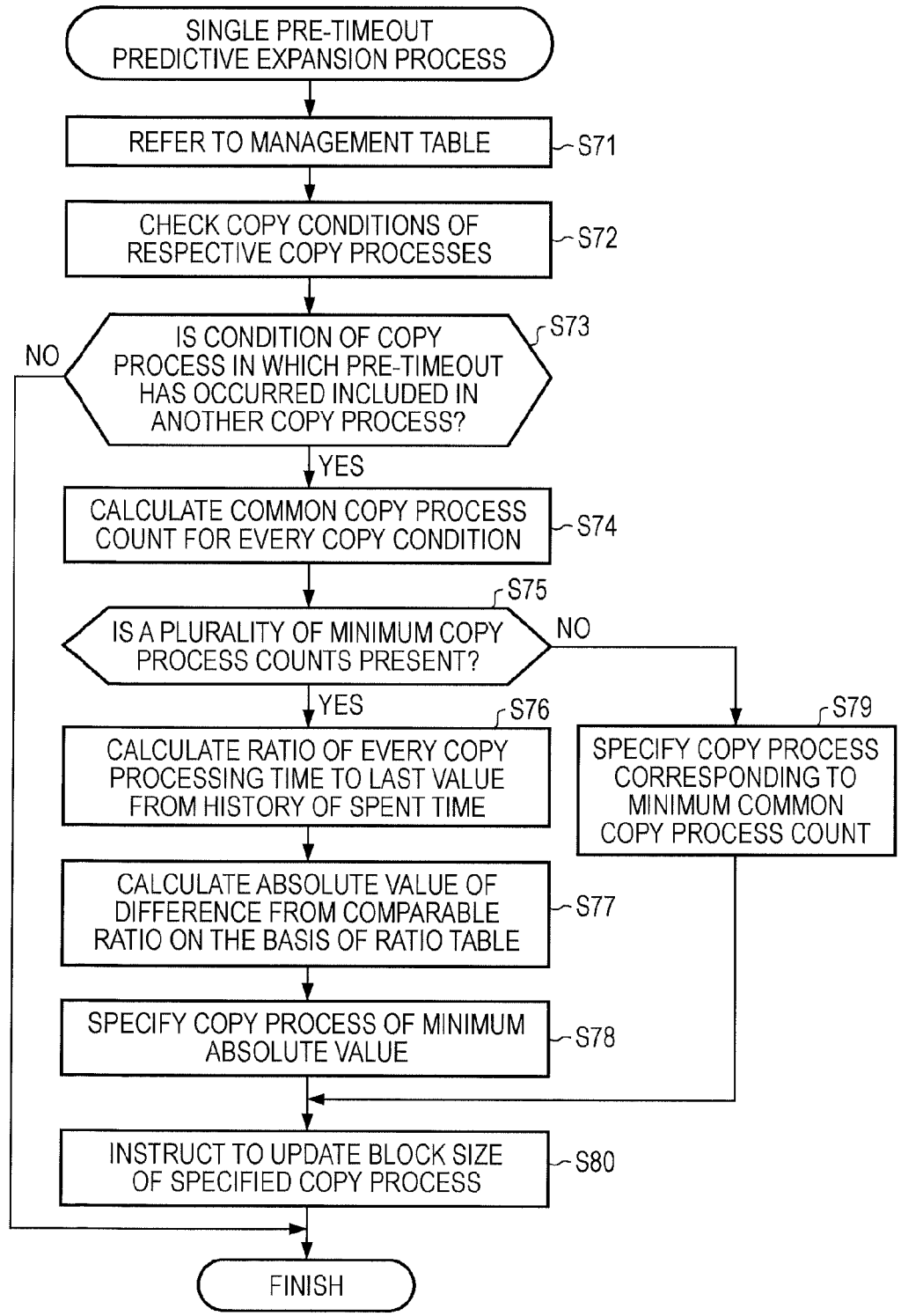
FIG. 30 is a flowchart which illustrates a single pre-timeout predictive expansion process of the fourth embodiment.

FIG. 30 is a flowchart which illustrates a single pre-timeout predictive expansion process of the fourth embodiment. The individual processes will be explained below in order of the numbers.

In operation S71, the change target detector 150a refers to the copy process management table 112 and produces the copy process extraction table 112c.

In operation S72, the change target detector 150a refers to the copy process extraction table 112c and checks copy conditions of the respective copy processes.

In operation S73, the change target detector 150a identifies whether a copy condition value of a copy process in which a pre-timeout has occurred is included in another copy process. If the identification is positive, the change target detector 150a shifts the process to a S74. If the identification is negative, the change target detector 150a finishes the process.

In operation S74, the change target detector 150a calculates a common copy process count for every one of the copy conditions. A method for calculating the common copy process count is a same as the method explained at the S42 in FIG. 19. They are different from each other, though, in that at the S74 the change target detector 150a calculates a common copy process count only among the copy processes including a same copy condition value as that included in the copy process in which the pre-timeout has occurred.

In operation S75, the change target detector 150a specifies a minimum value of the common copy process counts (excluding "1") calculated for the respective copy conditions. The change target detector 150a identifies whether the minimum common copy process count is found for a plurality of the copy conditions. If it is found for a plurality of the copy conditions, the change target detector 150 shifts the process to a S76. If it is found for one copy condition, the change target detector 150 shifts the process to a S79.

In operation S76, the change target detector 150a refers to the spent time history table 114 stored in the control data memory unit 110b, produces the ratio table 115 and stores the ratio table 115 in the control data memory unit 110b.

In operation S77, the change target detector 150a refers to the ratio table 115 stored in the control data memory unit 110b, produces the difference table 116 and stores the difference table 116 in the control data memory unit 110b.

In operation S78, the change target detector 150a refers to the difference table 116, and specifies a copy process of the smallest one (excluding "0") of the values set in the sum column. Then, the change target detector 150a shifts the process to a S80.

In operation S79, the change target detector 150a specifies a copy process including the copy condition value referred to when the minimum copy process count is calculated, and shifts the process to the S80.

In operation S80, the change target detector 150a instructs the block size controller 140 to change the block size in the copy process specified at the S78 or S79. The block size controller 140 instructs the copy processing unit 120 to copy data in a same block size as the block size determined at the S31 illustrated in FIG. 18 as to the copy process instructed by the change target detector 150a. The copy processing unit 120 changes the block size in the instructed copy process.

Upon detecting a pre-timeout in a certain copy process in this way, the change target detector 150a specifies, as a block size change target, a copy process for which an amount of time spent on a block copy changes in a way closest to that of the copy process in which the pre-timeout is detected.

Figure 31:
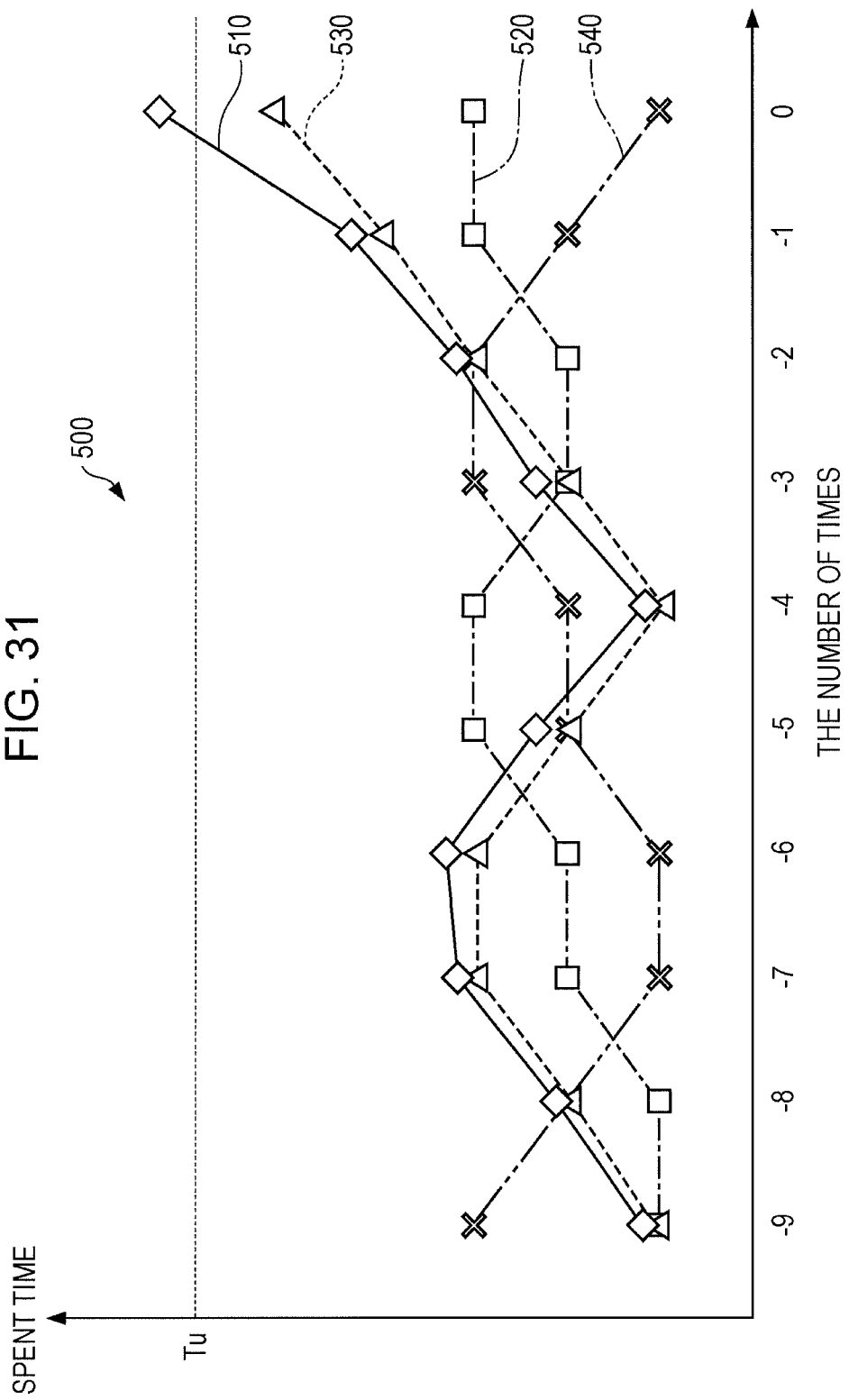
FIG. 31 specifically illustrates an exemplary transition of time spent on copy processes.

An exemplary predictive expansion process in case of an occurrence of a single pre-timeout will be specifically explained below while an exemplary time variation of time spent on block copies in the respective copy processes is being illustrated. FIG. 31 specifically illustrates an exemplary transition of time spent on copy processes. A graph 500 includes line graphs representing data in the spent time history table 114. The graph 500 indicates chains of plots 510, 520, 530 and 540.

The chain 510 indicates history of time spent on a block copy in the copy process corresponding to the copy process identification number "0001". The chain 520 indicates history of time spent on a block copy in the copy process corresponding to the copy process identification number "0002". The chain 530 indicates history of time spent on a block copy in the copy process corresponding to the copy process identification number "0003". The chain 540 indicates history of time spent on a block copy in the copy process corresponding to the copy process identification number "0004".

Refer to the chain 510. The amount of time spent on the latest block copy exceeds Tu, and a pre-timeout occurs. Then, no pre-timeout occurs in another copy process afterwards for a certain period of time. Thus, the virtual switch device 100b runs a predictive expansion process (illustrated in FIG. 30) in case of an occurrence of a single pre-timeout. Assume, at this time, that the copy processes "0002", "0003" and "0004" are being run parallel with the copy process "0001", and that plural minimum common process counts calculated on the basis of the copy conditions of the respective copy processes are present. Then, a copy process in which an amount of processing time changes in a way closest to that of the copy process in which the pre-timeout has occurred is specified as a block size change target through the process of the operations S76, S77 and S78 illustrated in FIG. 30.

To put it specifically, the change target detector 150a produces the ratio table 115 on the basis of the spent time history table 114. Further, the change target detector 150a produces the difference table 116 on the basis of the ratio table 115. The difference table 116 indicates, as described above, differences between the copy process "0001" in which a pre-timeout has occurred and another process. Thus, specify a copy process of the smallest value in the sum column set in the difference table 116. The specified copy process is the one in which an amount of processing time changes in a way closest to that of the copy process "0001" in which the pre-timeout has occurred.

In the difference table 116, e.g., the record of the copy process "0003" is of the smallest value set in the sum column. Thus, the copy process "0003" is presumably the one in which an amount of processing time changes in a way closest to that of the copy process "0001" in which the pre-timeout has occurred. Thus, the change target detector 150a detects the copy process "0003" as a block size change target.

Upon detecting a pre-timeout in a certain copy process in this way, the virtual switch device 100b detects a copy process for which an amount of time spent on a block copy changes in a way closest to that of the copy process in which the pre-timeout is detected, and changes the block size in the detected copy process.

A copy process in which a pre-timeout possibly occurs may thereby be more precisely specified. A reason why is that a copy process in which an amount of time spent on a block copy changes in a way close to that of the copy process in which the pre-timeout has occurred is presumably likely to need longer time for a block copy afterwards, even if no pre-timeout has occurred until present. Thus, presumably, a pre-timeout will probably occur in such a copy process.

As a result, the fourth embodiment has an effect similar to those of the second and third embodiments, and may restrain a pre-timeout and a timeout from occurring more efficiently. Incidentally, the functions of the virtual switch devices 100, 100a and 100b described above may be implemented by means of a computer running a program in which what is processed according to the functions is written. The program in which what is processed is written may be recorded on a computer-readable recording medium. The computer-readable recording medium may be a magnetic memory device, an optical disk, a magneto-optical recording medium, a semiconductor memory, etc. The magnetic memory device may be a hard disk drive (HDD), a flexible disk (FD), a magnetic tape, etc. The optical disk may be a DVD (Digital Versatile Disc), a DVD-RAM, a CD-ROM (Compact Disc Read Only memory), a CD-R (Recordable)/RW (ReWritable), etc. The magneto-optical medium may be an MO (Magneto-Optical disc), etc.

In order that a program is distributed, e.g., a removable recording medium such as a DVD or a CD-ROM in which the program is recorded is sold. Further, the program may be stored in a memory device of a server computer and transferred from the server computer to another computer via a network.

A computer which runs a program, e.g., stores the program recorded in a removable recording medium or transferred from a server computer into a memory device of the computer. Then the computer reads the program from the memory device of the computer, and runs a process according to the program. Incidentally, the computer may read the program directly from the removable recording medium and run the process according to the program. Further, the computer may successively run a process according to a program every time the program is transferred from the server computer.

The data processing device, the program for data processing and the method for copy processing of the application have been explained above on the basis of the illustrated embodiments. The invention is not limited to the above, and each of the portions may be replaced with a portion of any structure having a same function. Further, any other portions or operations may be added to the embodiments. Still further, any two or more of the portions (features) of the embodiments described above may be combined with one another.

According to the data processing device, the program for data processing and the method for copy processing described above, data may be efficiently copied.

As mentioned above, the present invention has been specifically described for better understanding of the embodiments thereof and the above description does not limit other aspects of the invention. Therefore, the present invention may be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data processing device comprising:
   a memory; and
   a processor coupled to the memory and configured to:
   copy data stored in a first memory unit into a second memory unit on a block-by-block basis where the data is divided into blocks of a specific size;
   measure an amount of time taken to copy a block of the data;
   change a size of the block to a size smaller than a current size when the amount of time measured runs up to a specific threshold which is shorter than a timeout time; and
   start to measure the amount of time when the copying of the block starts, and interrupt the copying of the block when the amount of time is over the timeout time.

2. The data processing device according to claim 1, wherein:
   a first copy and a second copy are carried out for copying first data and second data, respectively, on a block-by-block basis, and
   a size of a block of the first copy and a size of a block of the second copy are respectively changed upon a first amount of time measured running up to the specific threshold, the first amount of time corresponding with a copy of the block of the first copy.

3. The data processing device according to claim 2, wherein the size of the block of the first copy and the size of the block of the second copy are changed upon both the first amount of time and a second amount of time running up to the specific threshold, the second amount of time corresponding with a copy of the block of the second copy.

4. The data processing device according to claim 2, wherein:
   copy process management data being stored in a control data memory is referenced upon the first time running up to the specific threshold, the copy process management data including a plurality of pieces of copy condition information related to each of the first copy and the second copy, and
   the size of the block of the first copy and the size of the block of the second copy are changed in a case where there is copy condition information common to the first copy and the second copy.

5. The data processing device according to claim 4, wherein:
   a third copy is carried out for copying third data on a block-by-block basis,
   the copy process management data is referenced upon the first time running up to the specific threshold; and
   the processor selects, in a case where there is first copy condition information common to the first copy and the second copy and there is second copy condition information common to the first copy and the third copy, as to which of the second copy and the third copy includes a change in the size of the block based on a priority defined in each of the first copy condition information and the second copy condition information.

6. The data processing device according to claim 5, wherein the priority is changed every time a selection is made as to which of the second copy and the third copy includes a change to the size of the block.

7. The data processing device according to claim 1, wherein the size of the block is changed to a size larger the current size in a case where the amount of time measured is below a lower limit which is smaller than the specific threshold.

8. The data processing device according to claim 1, wherein the processor is configured to copy blocks of the data including the block to correspond with the change of the size of the block.

9. The data processing device according to claim 1, wherein the processor is configured to copy the block with the size smaller than the current size after interrupting the copying of the block.

10. A non-transitory computer readable medium that stores a program for data processing that causes a computer to execute a process comprising:
    copying data stored in a first memory unit into a second memory unit on a block-by-block basis where the data is divided into blocks having a specific size;
    measuring an amount of time taken to copy a block of the data;
    changing a size of the block to a size smaller than a current size when the measured amount of time runs up to a specific threshold which is shorter than a timeout time; and
    starting to measure the amount of time when the copying of the block starts, and interrupting the copying of the block when the amount of time is over the timeout time.

11. The non-transitory computer-readable medium according to claim 10, wherein the process comprising copying blocks of the data including the block to correspond with the change of the size of the block.

12. A method for controlling a data processing device for copy processing, comprising:
    copying data stored in a first memory unit into a second memory unit on a block-by-block basis, the data being divided into blocks having a specific size by a computer;
    measuring an amount of time taken to copy a block of the data;
    changing a size of the block to a size smaller than a current size when the measured amount of time runs up to a specific threshold which is shorter than a timeout time; and
    starting to measure the amount of time when the copying of the block starts, and interrupting the copying of the block when the amount of time is over the timeout time.

13. The method according to claim 12, comprising copying blocks of the data including the block to correspond with the change of the size of the block.

* * * * *

UNITED STATES PATENT AND TRADEMARK OFFICE
CERTIFICATE OF CORRECTION

PATENT NO.         : 8,819,366 B2                                        Page 1 of 1
APPLICATION NO.    : 13/212599
DATED              : August 26, 2014
INVENTOR(S)        : Koutarou Sasage It is certified that error appears in the above-identified patent and that said Letters Patent is hereby corrected as shown below:

In the Claims

Column 29, line 29, in Claim 1, delete "basis where" and insert -- basis, where --, therefor.
Column 30, line 21, in Claim 7, delete "larger the" and insert -- larger than the --, therefor.
Column 30, line 38, in Claim 10, delete "basis where" and insert -- basis, where --, therefor.

Signed and Sealed this
Eighteenth Day of November, 2014

Michelle K. Lee
*Deputy Director of the United States Patent and Trademark Office*